(12) United States Patent
Valente et al.

(10) Patent No.: US 8,986,151 B2
(45) Date of Patent: Mar. 24, 2015

(54) DISCONNECTING REAR DRIVE AXLE FOR LONGITUDINALLY ARRANGED POWERTRAINS

(75) Inventors: Paul J. Valente, Berkley, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 419 days.

(21) Appl. No.: 13/395,209

(22) PCT Filed: Dec. 8, 2010

(86) PCT No.: PCT/US2010/059444
§ 371 (c)(1),
(2), (4) Date: Mar. 9, 2012

(87) PCT Pub. No.: WO2011/072004
PCT Pub. Date: Jun. 16, 2011

(65) Prior Publication Data
US 2012/0238394 A1 Sep. 20, 2012

Related U.S. Application Data

(60) Provisional application No. 61/267,700, filed on Dec. 8, 2009.

(51) Int. Cl.
*B60K 17/34* (2006.01)
*B60K 17/35* (2006.01)
(Continued)

(52) U.S. Cl.
CPC ............... *B60K 17/35* (2013.01); *B60K 17/346* (2013.01); *F16H 48/08* (2013.01); *F16H 2200/0017* (2013.01)
USPC ........... 475/231; 180/233; 180/247; 180/248; 180/249

(58) Field of Classification Search
USPC ........................ 180/233, 247–249; 475/231
See application file for complete search history.

(56) References Cited

U.S. PATENT DOCUMENTS 4,407,387 A 10/1983 Lindbert
4,625,584 A * 12/1986 Onodera ................. 475/160
(Continued)

FOREIGN PATENT DOCUMENTS

KR 1019950005360 B1 5/1995
KR 1019970074150 A 12/1997

OTHER PUBLICATIONS

International Search Report and Written Opinion for PCT/US2010/059444, mailed Aug. 30, 2011; ISA/KR.

*Primary Examiner* — Derek D Knight
(74) *Attorney, Agent, or Firm* — Harness, Dickey & Pierce, P.L.C.

(57) ABSTRACT

A powertrain with a disconnecting rear drive axle generally includes a prime mover including an output that rotates about a rotational axis. A transmission includes an output that rotates about a rotational axis. The rotational axes of the outputs are substantially parallel to a longitudinal axis of the powertrain. A front driveline is operable to direct rotary power from the prime mover to front vehicle wheels. A rear driveline includes a propeller shaft that provides rotary power to a first shaft member and a second shaft member through a pinion and a ring gear. The first shaft member and the second shaft are operable to connect to rear vehicle wheels. A power switching mechanism has an engaged condition and a disengaged condition. The power switching mechanism is operable to direct the rotary power from the transmission to the rear driveline in the engaged condition. A torque transfer device has an engaged condition and a disengaged condition. The power switching mechanism and the torque transfer device in the disengaged condition are operable to only transmit rotary power to the first vehicle wheels. The torque transfer device in the disengaged condition prevents the first shaft member and the second shaft member from back-driving the ring gear and the pinion of the rear driveline. The power switching mechanism in the disengaged condition prevents the transmission from driving the propeller shaft.

10 Claims, 18 Drawing Sheets

(51) Int. Cl.
  *B60K 17/346* (2006.01)
  *F16H 48/08* (2006.01)

(56) References Cited

U.S. PATENT DOCUMENTS

| | | | |
|---|---|---|---|
| 4,938,738 A | 7/1990 | Fuelberth et al. | |
| 5,370,588 A | 12/1994 | Sawase et al. | |
| 5,701,247 A * | 12/1997 | Sasaki | 701/1 |
| 6,916,265 B2 * | 7/2005 | Imamura | 475/142 |
| 7,022,041 B2 | 4/2006 | Valente | |
| 7,207,409 B2 | 4/2007 | Downs | |
| 7,232,397 B2 | 6/2007 | Valente | |
| 7,363,995 B2 | 4/2008 | Downs et al. | |
| 7,425,006 B2 | 9/2008 | Worman, Jr. | |
| 7,458,437 B2 * | 12/2008 | Davidsson | 180/233 |
| 7,534,187 B2 | 5/2009 | Donofrio et al. | |
| 7,611,437 B2 | 11/2009 | Valente | |
| 7,837,588 B2 | 11/2010 | Valente | |
| 7,901,318 B2 | 3/2011 | Downs et al. | |
| 7,950,510 B2 | 5/2011 | Marsh et al. | |
| 8,042,642 B2 | 10/2011 | Marsh et al. | |
| 8,047,323 B2 | 11/2011 | Downs et al. | |
| 8,083,041 B2 | 12/2011 | Capito et al. | |
| 2002/0033293 A1 | 3/2002 | Fukuda et al. | |

* cited by examiner

DISCONNECTING REAR DRIVE AXLE FOR LONGITUDINALLY ARRANGED POWERTRAINS

CROSS-REFERENCE TO RELATED APPLICATIONS

This application claims the benefit of U.S. Provisional Application No. 61/267,700, filed on Dec. 8, 2009. The entire disclosure of the above application is incorporated herein by reference.

FIELD

The present disclosure relates to a disconnecting rear drive axle for a longitudinally arranged powertrain.

BACKGROUND

Many modern automotive vehicles, such as cross-over vehicles, are available with an all-wheel drive (AWD) driveline that is based on a front-wheel drive (FWD) architecture. Such AWD drivelines typically include components, such as the output of a power-take-off, that are rotatably driven even when the driveline is operated in a mode in which power is not transmitted through such components. Consequently, such AWD drivelines can be less fuel efficient (according to standards established by the U.S. Environmental Protection Agency) than similar FWD drivelines by one or two miles per gallon.

With reference to FIG. 1, a portion of an exemplary vehicle having a longitudinal transaxle 2 can be disposed generally parallel to a longitudinal axis of the vehicle. A transmission output member 3 is a hollow shaft, while the front and rear driveline inputs 4, 5 are solid shafts. The front driveline input 4 extends through the transmission and is coupled to a hypoid pinion 6 that is meshingly engaged with a ring gear 7 associated with the front differential 8. The rear driveline input 5 is configured to be coupled to a cardan shaft (not shown).

Copending U.S. patent application Ser. No. 12/191,699 filed Aug. 14, 2008 and U.S. patent application Ser. No. 12/537,394 filed Aug. 7, 2009, both of which are entitled "Motor Vehicle With Disconnectable All-Wheel Drive System", disclose various disconnecting rear drive axles for laterally arranged powertrains (i.e., powertrains that incorporate a laterally disposed power source, such as an internal combustion engine, and a transaxle that includes a power-take-off).

SUMMARY

The present teachings generally include a powertrain with a disconnecting rear drive axle. The powertrain generally includes a prime mover including an output that rotates about a rotational axis. A transmission includes an output that rotates about a rotational axis. The rotational axes of the outputs are substantially parallel to a longitudinal axis of the powertrain. A front driveline is operable to direct rotary power from the prime mover to front vehicle wheels. A rear driveline includes a propeller shaft that provides rotary power to a first shaft member and a second shaft member through a pinion and a ring gear. The first shaft member and the second shaft are operable to connect to rear vehicle wheels. A power switching mechanism has an engaged condition and a disengaged condition. The power switching mechanism is operable to direct the rotary power from the transmission to the rear driveline in the engaged condition. A torque transfer device has an engaged condition and a disengaged condition. The power switching mechanism and the torque transfer device in the disengaged condition are operable to only transmit rotary power to the first vehicle wheels. The torque transfer device in the disengaged condition prevents the first shaft member and the second shaft member from back-driving the ring gear and the pinion of the rear driveline. The power switching mechanism in the disengaged condition prevents the transmission from driving the propeller shaft.

Further areas of applicability will become apparent from the description and claims provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
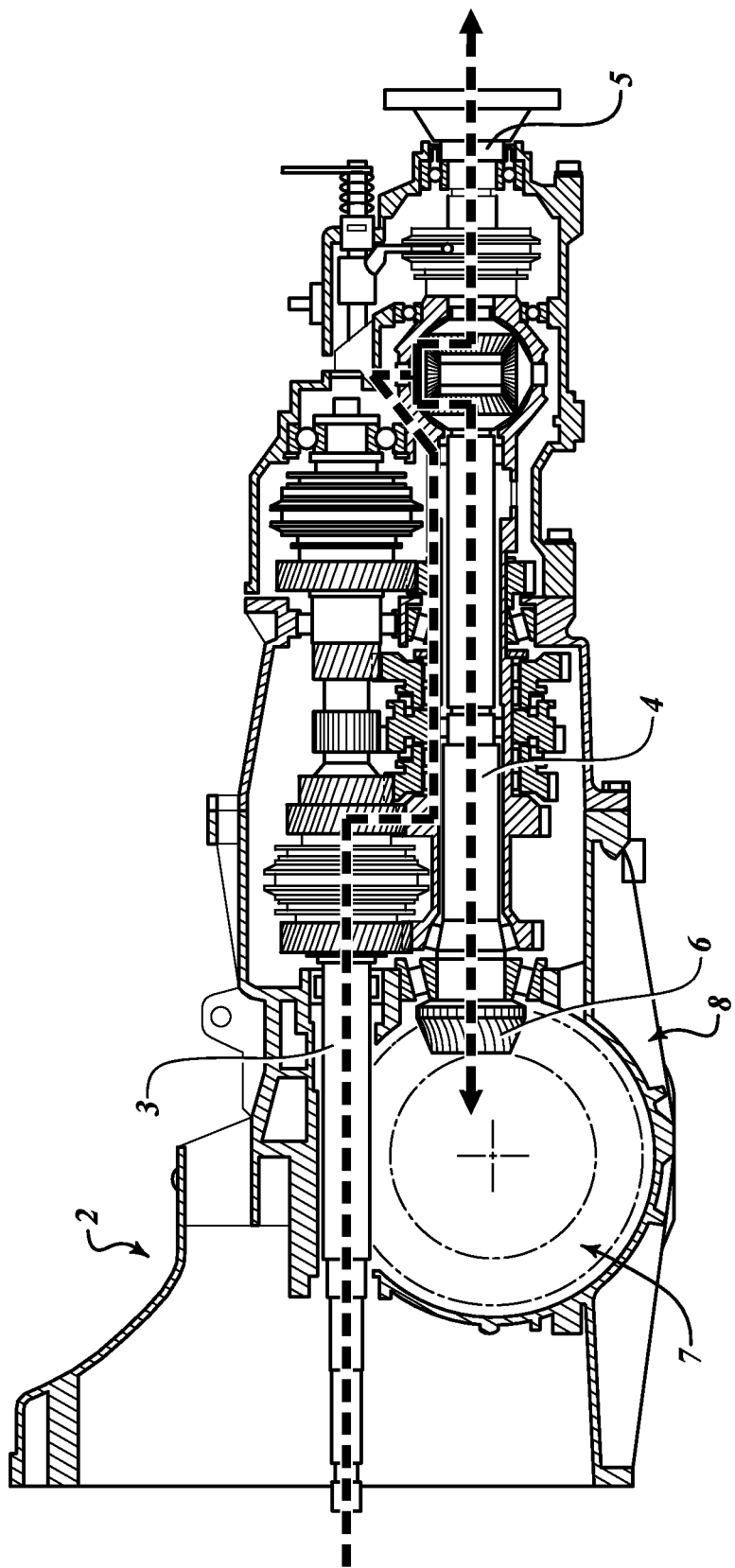
FIG. 1 illustrates a portion of a prior art vehicle with a longitudinally-disposed transaxle that is disposed generally parallel to a longitudinal axis of the vehicle.
Figure 2:
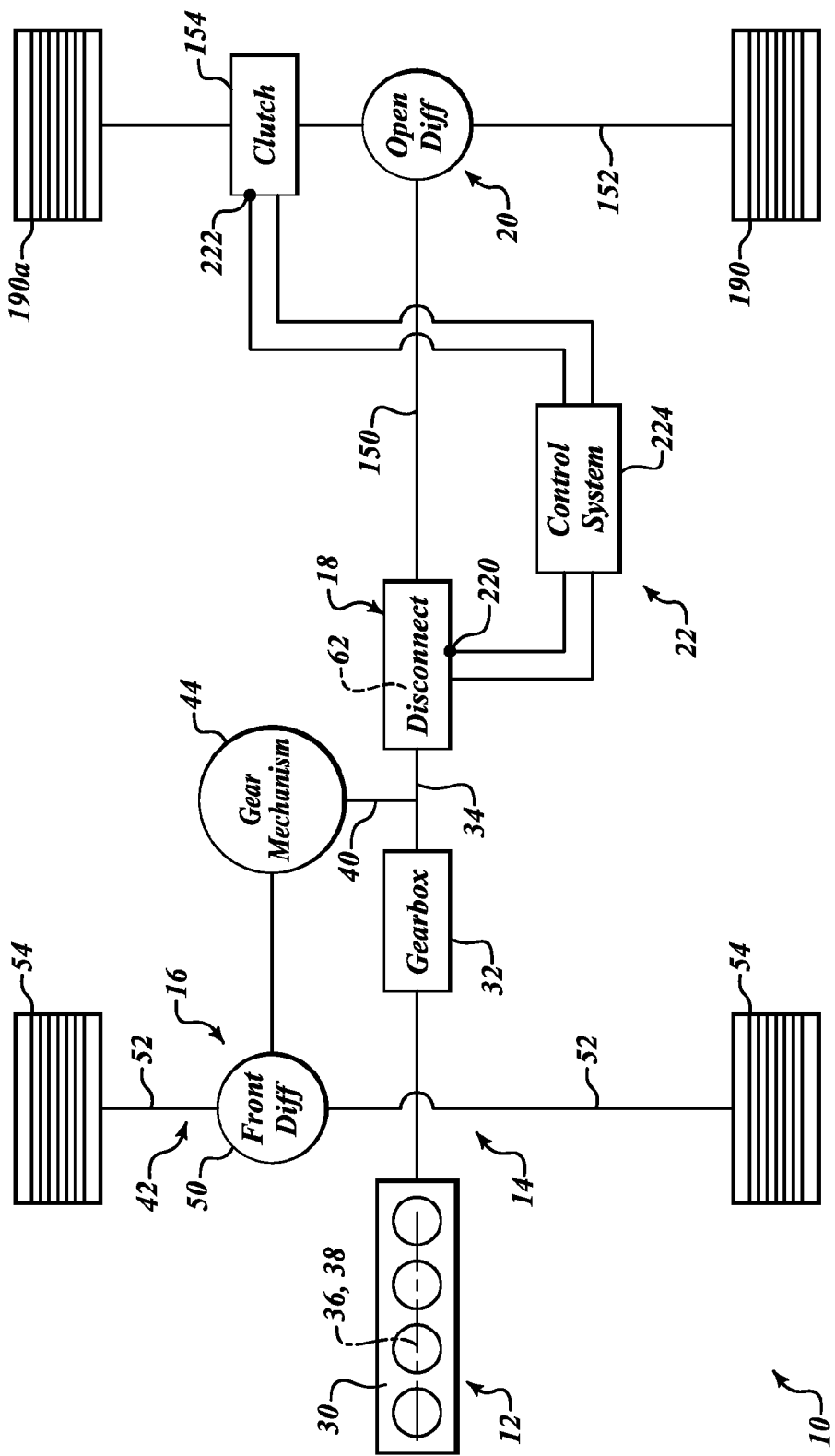
FIG. 2 is a schematic illustration of a vehicle having a drivetrain constructed in accordance with the present teachings.

With reference to FIG. 2 of the drawings, a vehicle constructed in accordance with the teachings of the present invention is generally indicated by reference numeral 10. The vehicle 10 can include a powertrain 12 and a drivetrain 14 that can include a primary driveline 16, a power switching mechanism 18, a secondary driveline 20, and a control system 22. In the various aspects of the present teachings, the primary driveline 16 can be a front driveline and the secondary driveline 20 can be a rear driveline.

The powertrain 12 can include a prime mover 30, such as an internal combustion engine or an electric motor, and a transmission 32, which can be any type of transmission, such as a manual, automatic, or continuously variable transmission. The transmission 32 can have an output member 34 that can have a rotational axis 36 that can be arranged coincident with or parallel to a longitudinal axis 38 of the vehicle 10. The prime mover 30 can provide rotary power to the transmission 32, which outputs rotary power to the primary driveline 16 and the power switching mechanism 18. It will be appreciated in light of the present disclosure that the rotational axes of the prime mover 30, or the transmission 32, or both can be substantially parallel to the longitudinal axis 38 to accommodate, for example, manufacturing tolerances.

Figure 3:
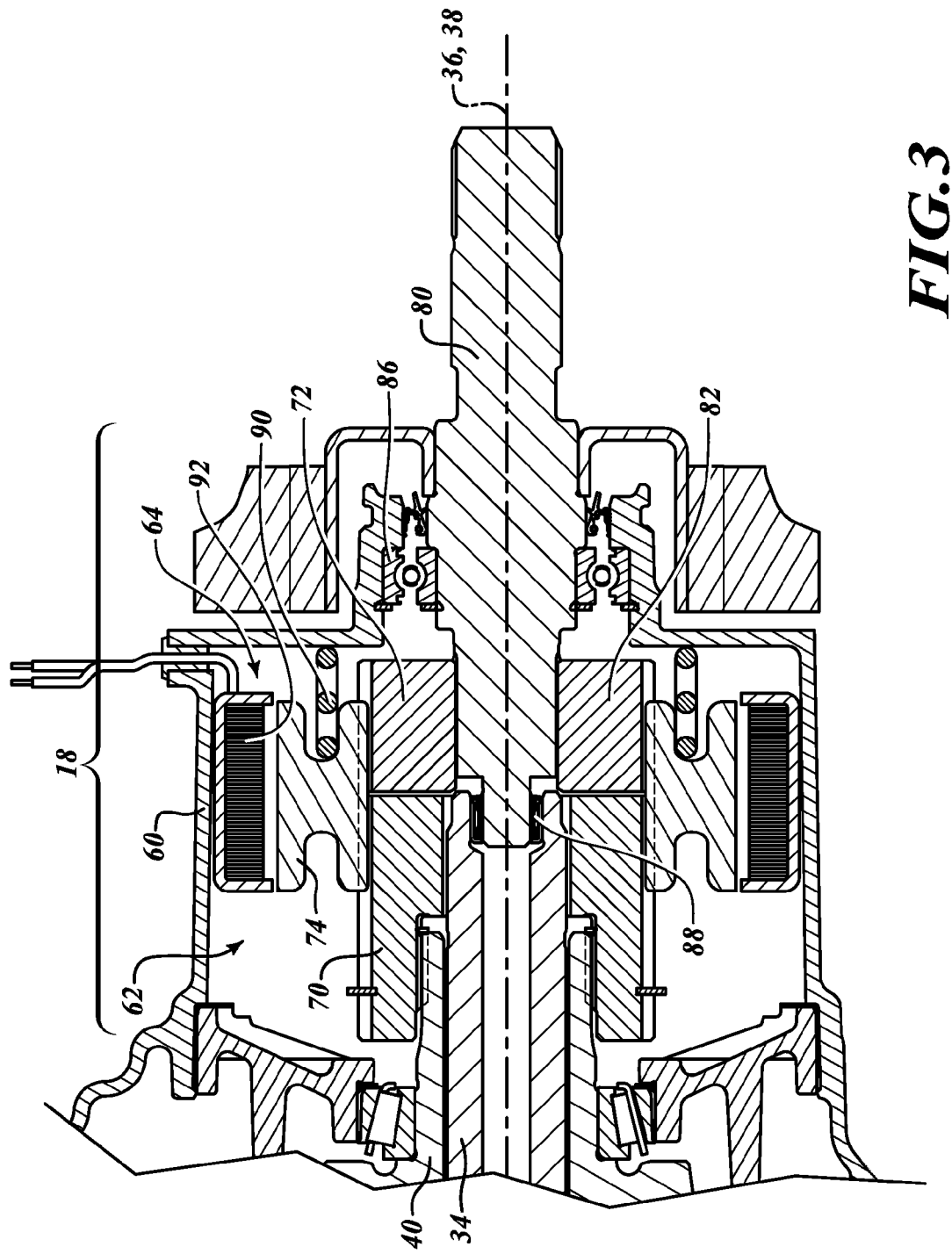
FIG. 3 is a longitudinal cross-sectional view of a portion of the drivetrain of FIG. 2 illustrating a portion of a power switching mechanism constructed in accordance with the present teachings.

With additional reference to FIGS. 2 and 3, the primary driveline 16 can include a first driveline input member 40, which can be driven by the output member 34 of the transmission 32, and a primary axle assembly 42 that can be driven by the first driveline input member 40. The first driveline input member 40 can be integrally formed with the output member 34 of the transmission 32.

In the particular example provided, a gear system 44 (e.g.: a beveloid) can include a first bevel gear (not specifically shown), which is coupled to the first driveline input member 40 for rotation therewith, and a second bevel gear (not specifically shown), which is meshingly engaged to the first bevel gear and coupled for rotation with an input member of the primary axle assembly 42. The gear system 44 can be employed to transmit rotary power between the output member 34 of the transmission 32 and the primary axle assembly 42. The primary axle assembly 42 can include a first differential assembly 50 and a pair of first axle shafts 52 that can couple the first differential assembly 50 to a set of first vehicle wheels 54. The first differential assembly 50 can include a first differential case and a first gear set that is received in the first differential case. A first ring gear can be coupled to the first gear case and can be meshingly engaged with a first input pinion that can be drivingly coupled to the second bevel gear.

With reference to FIG. 3, the power switching mechanism 18 can comprise any type of clutch, disconnect or coupling (e.g., dog clutch, friction clutch, synchronizer) that can be employed to selectively transmit rotary power between the transmission 32 (FIG. 2) and the secondary driveline 20. In the particular example provided, the power switching mechanism 18 can include a housing 60, a disconnect assembly 62 and an actuator 64. The housing 60 can be co-formed or coupled to the housing of the transmission 32. The disconnect assembly 62 can include a disconnect input member 70, a disconnect output member 72, and a coupling member 74. The disconnect input member 70 can be coupled for rotation with the output member 34 of the transmission 32 in any desired manner, such as through a splined connection with the output member 34 and can comprise a plurality of circumferentially spaced apart longitudinally extending teeth or splines formed about its outer circumferential surface.

The disconnect output member 72 can include a shaft portion 80 and a clutch portion 82 that is fixedly coupled to the shaft portion 80. In the particular example provided, the shaft portion 80 and the clutch portion 82 can be discrete components, but it will be appreciated in light of the disclosure that the shaft portion 80 and the clutch portion 82 can be integrally formed. The shaft portion 80 can be supported for rotation in the housing 60 by bearings. In the example provided, a first set of bearings 86 can be disposed between the housing 60 and the shaft portion 80 to support a first end of the shaft portion 80, while a second set of bearings 88 can be disposed between a reduced diameter end of the shaft portion 80 and an internal surface in a cylindrical cavity of the output member 34 of the transmission 32. The clutch portion 82 can comprise a plurality of circumferentially spaced apart longitudinally extending teeth or splines formed about its outer circumferential surface. The coupling member 74 can comprise a plurality of circumferentially spaced apart longitudinally extending teeth or splines formed about its interior circumferential surface. The splines of the coupling member 74 can be slidably engaged to the splines of the disconnect input member 70 and the splines of the disconnect output member 72.

The actuator 64 can be any type of actuator for selectively engaging the disconnect assembly 62. For example, the actuator 64 can comprise a biasing spring 90 and an electromagnetic coil 92. The biasing spring 90 can be coupled to the housing 60 and can be employed to bias the coupling member 74 in a predetermined direction so as to cause the disconnect assembly 62 to be either normally engaged (so as to be capable of transmitting torque therethrough) or normally disengaged (so as to inhibit the transmission of torque therethrough). In the particular example provided, the biasing spring 90 can bias the coupling member 74 out of engagement with the splines of the disconnect output member 72 so that the disconnect assembly 62 is normally disengaged. The electromagnetic coil 92 can be mounted to the housing 60 coaxially about the coupling member 74 and can be energized to create a magnetic field that can magnetically attract the coupling member 74 so that the coupling member 74 can translate (against the bias of the biasing spring 90) into engagement with the splines of the disconnect output member 72.

Figure 4:
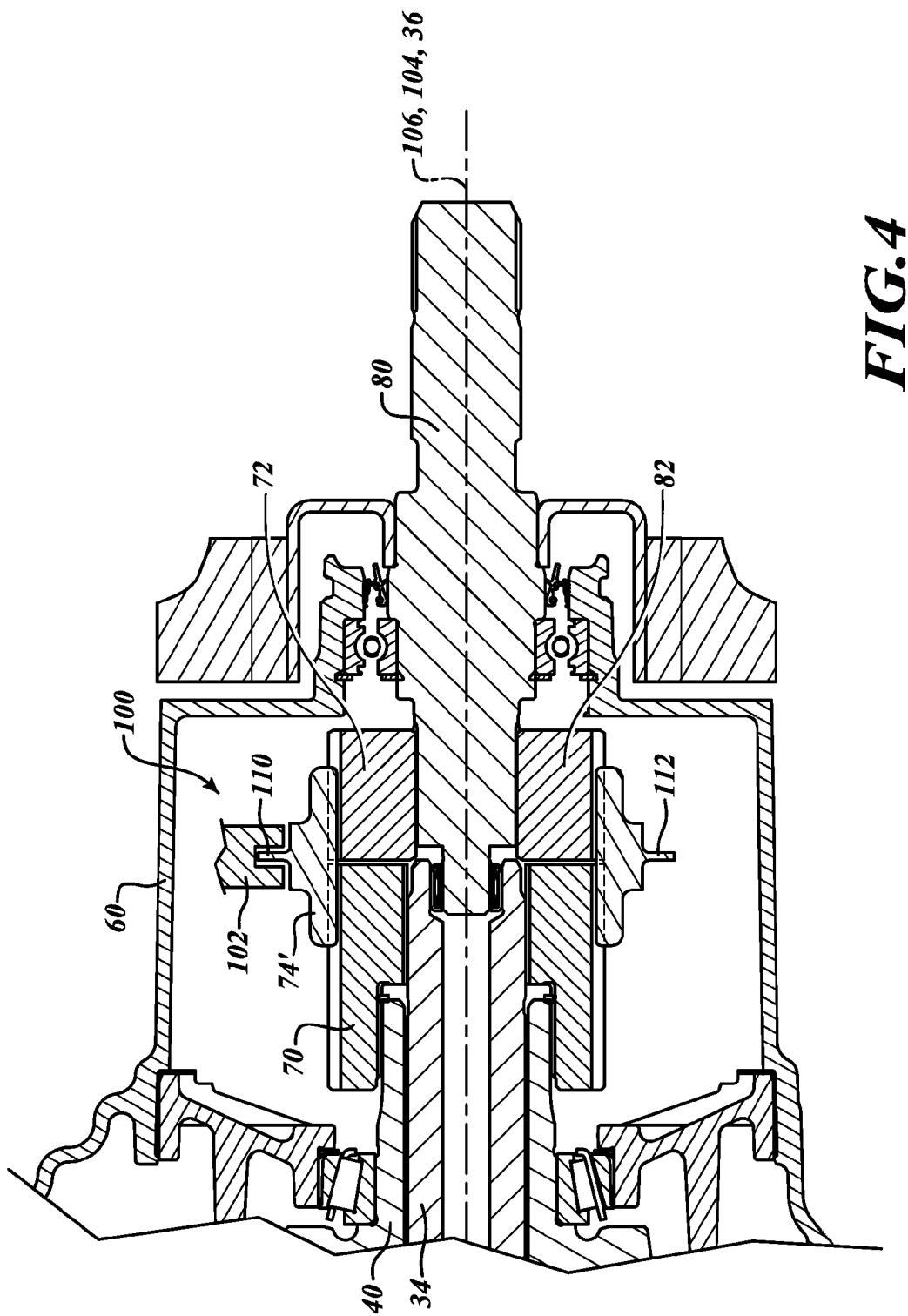
FIG. 4 is a view similar to that of FIG. 3 and illustrates a power switching mechanism constructed in accordance with another example of the present teachings.

It will be appreciated in light of the disclosure, however, that any type of actuator can be used, including a shift fork actuator 100 as shown in FIG. 4. In this example, a translating shift fork 102 can be employed and can be mounted to the housing 60 for translation along an axis 104 that can be generally parallel to a rotational axis 106 of the disconnect input member 70 and the disconnect output member 72. With reference to FIG. 4, the shift fork 102 can include an annular groove 110 into which a circumferentially extending rib 112 on a coupling member 74' can be received. The shift fork 102 can be translated manually (i.e., in response to a force that is applied by the operator of the vehicle through a linkage to the shift fork 102) or by a powered mechanism, such as a solenoid, a pneumatic or hydraulic cylinder, or a ball screw.

Figure 5:
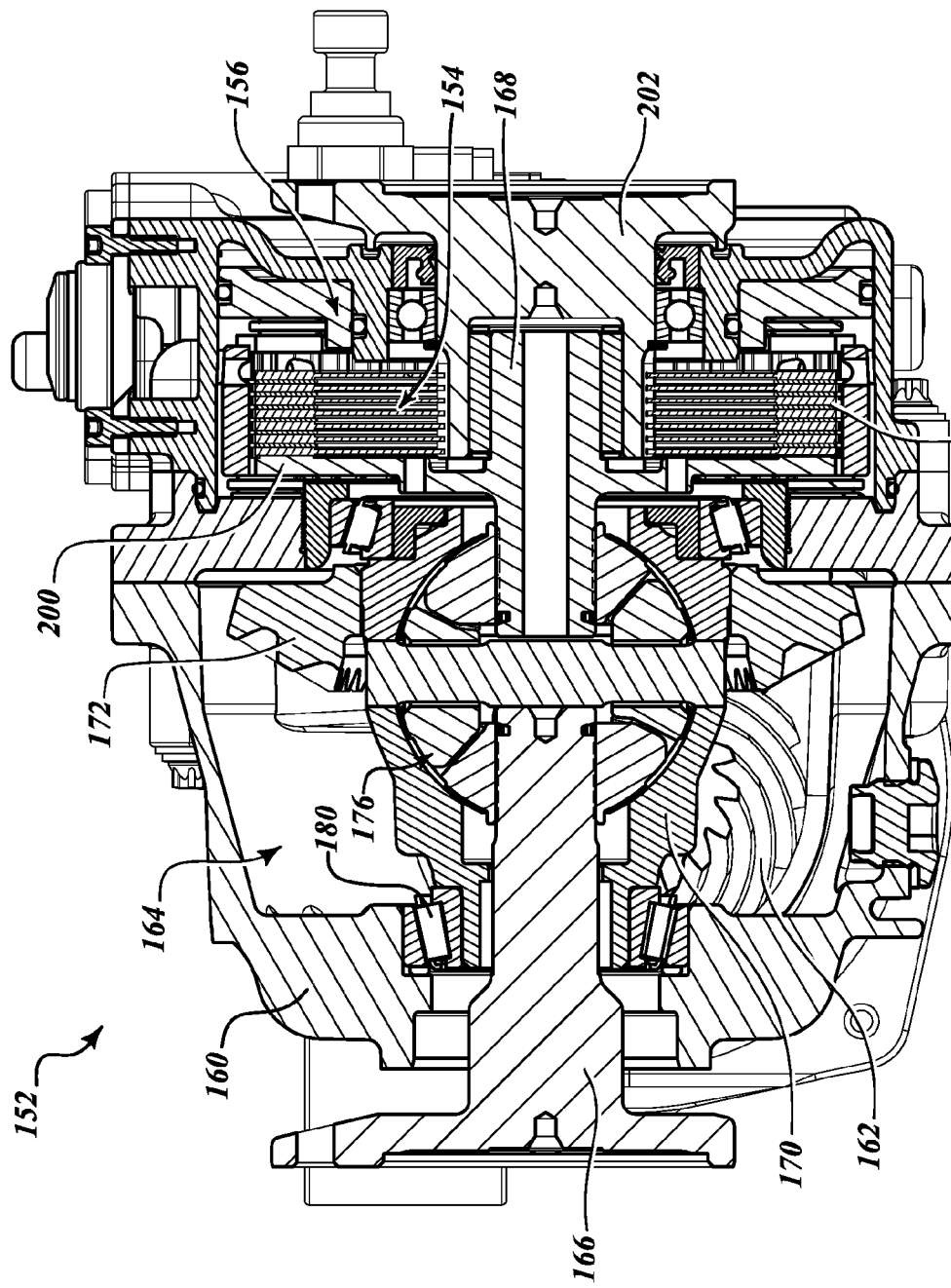
FIG. 5 is a transverse cross-sectional view of a portion of the drivetrain of FIG. 2 illustrating the rear axle assembly constructed in accordance with the present teachings.

With reference to FIGS. 2, 3, and 5, the secondary driveline 20 can include a propeller shaft 150, a secondary axle assembly 152, and at least one torque transfer device 154. A first end of the propeller shaft 150 can be coupled for rotation with the disconnect output member 72 of the disconnect assembly 62.

With reference to FIG. 5, the secondary axle assembly 152 can include a carrier housing 160, an input pinion 162, a second differential assembly 164, a first shaft member 166, and a second shaft member 168. The input pinion 162 can be rotatably mounted to the carrier housing 160 and can be coupled to a second end of the propeller shaft 150. The second differential assembly 164 can be mounted in the carrier housing 160 and can include a differential case 170, a ring gear 172, and a gearset 176. The differential case 170 can be rotatably mounted on the carrier housing 160 on a set of bearings 180 and can define an internal cavity into which the gearset 176 can be received. The ring gear 172 can be fixed to the differential case 170 and can include a plurality of ring gear teeth that can be meshingly engaged to corresponding teeth of the input pinion 162 such that rotation of the input pinion 162 causes corresponding rotation of the ring gear 172 and the second differential assembly 164.

The gearset 176 can conventionally include a plurality of pinion gears and a pair of side gears. The first and second shaft members 166 and 168 can have a first end, which can be coupled to the gearset 176 (i.e., each can be coupled for rotation with an associated one of the side gears), and a second, opposite end. The second end of the first shaft member 166 can be coupled to an associated one of the second vehicle wheels 190, while the second end of the second shaft member 168 can be coupled to an input member 200 of the torque transfer device 154.

The torque transfer device 154 (e.g.: a clutch) can be employed to selectively transmit rotary power between the input member 200 and an output member 202 of the torque transfer device 154. The output member 202 of the torque transfer device 154 can be coupled for rotation with an associated one (i.e., 190a) of the set of the second vehicle wheels 190. In the particular example provided, the torque transfer device 154 can include a clutch 210, such as a conventional electrically-controlled friction clutch. The clutch 210 can be controlled by the control system 22 (FIG. 2) to operate in a first clutch mode, in which the clutch 210 is in an engaged condition and rotary power is transmitted between the input and output members 200 and 202 of the torque transfer device 154. The clutch 210 can also operate in a second clutch mode, in which the clutch 210 is in a disengaged condition and rotary power is not transmitted between the input and output members 200 and 202.

With reference to FIGS. 2 and 5, the control system 22 can include a first sensor 220, a second sensor 222, and a controller 224. The first sensor 220 can be configured to sense a rotational speed of a component associated with the primary driveline 16, such as the output member 34 of the transmission 32, and to responsively generate a first sensor signal in response thereto. The second sensor 222 can be configured to sense a rotational speed of a component associated with the secondary driveline 20, such as the input member 200 of the torque transfer device 154, and to responsively generate a second sensor signal in response thereto. The controller 224 can control operation of the at least one torque transfer device 154 based in part on the first and second sensor signals.

With reference to FIG. 2, the drivetrain 14 can be operated in a first mode in which rotary power is transmitted to the first vehicle wheels 54 mounted to the primary driveline 16, as well as to the second vehicle wheels 190, 190a mounted to the secondary driveline 20. To effect operation in the first mode, the disconnect assembly 62 of the power switching mechanism 18 can be operated in an engaged condition, which permits the transmission of rotary power between the output member 34 of the transmission 32 and the disconnect output member 72 (FIGS. 3 and 4). With reference to FIG. 5, the torque transfer device 154 of the secondary axle assembly 152 can be operated in an engaged condition, which effects driving engagement of the second differential assembly 164 with the first and second shaft members 166 and 168.

As is shown in FIG. 2, the drivetrain 14 does not include a center differential or viscous coupling that permits speed differentiation between the first driveline input member 40 and the input pinion 162. The torque transfer device 154 associated with the secondary axle assembly 152 can therefore be configured or controlled to slip or cyclically disengage and re-engage as appropriate, when for example the reduction ratio of the secondary driveline 20 is different from the primary driveline 16.

The drivetrain 14 can be also operated in a second mode in which rotary power is transmitted exclusively to the first vehicle wheels 54 mounted to the primary driveline 16. To effect operation in the second mode, the disconnect assembly 62 of the power switching mechanism 18 can be operated in a disengaged condition, which inhibits the transmission of rotary power between the output member 34 of the transmission 32 and the disconnect output member 72. The torque transfer device 154 of the secondary axle assembly 152 can be operated in a disengaged condition, which inhibits the first and second shaft members 166 and 168 from back-driving the differential case 170, the ring gear 172 and the input pinion 162.

It will be appreciated in light of the disclosure that the propeller shaft 150, the input pinion 162, the ring gear 172 and the differential case 170 do not rotate when the drivetrain 14 is operated in the second mode so that the vehicle 10 can be shown to operate with improved fuel economy relative to operation of the drivetrain 14 in the first mode. It can be shown the improved fuel economy can be achieved when even portions of the gearset 176 can continue to be driven in the second mode.

Figure 6:
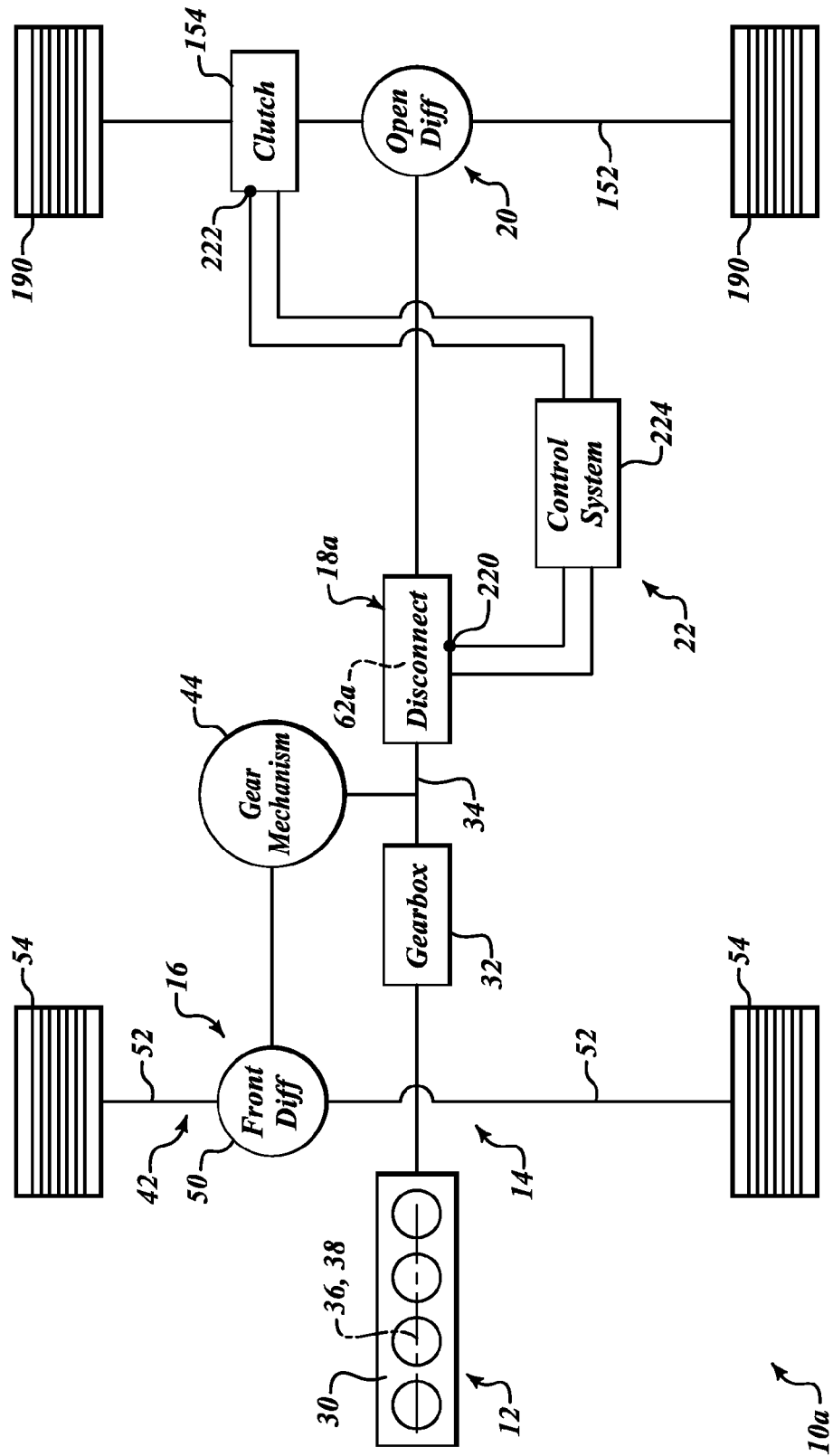
FIG. 6 is a schematic illustration of a vehicle having another exemplary drivetrain constructed in accordance with the present teachings.

With reference to FIG. 6, another vehicle constructed in accordance with the present teachings is generally indicated by reference numeral 10a. The vehicle 10a is generally similar to the vehicle 10 of FIG. 2, except that a disconnect assembly 62a associated with the power switching mechanism 18a can include a synchronizer (e.g.: a synchronizer 230 in FIG. 7) having a first and second portion that can be matingly engaged to one another to synchronize the rotational speed of the disconnect output member to either the output member 34 of the transmission 32 or the disconnect input member prior to movement of the coupling member to a position where it engages both the disconnect input member and the disconnect output member.

Figure 7:
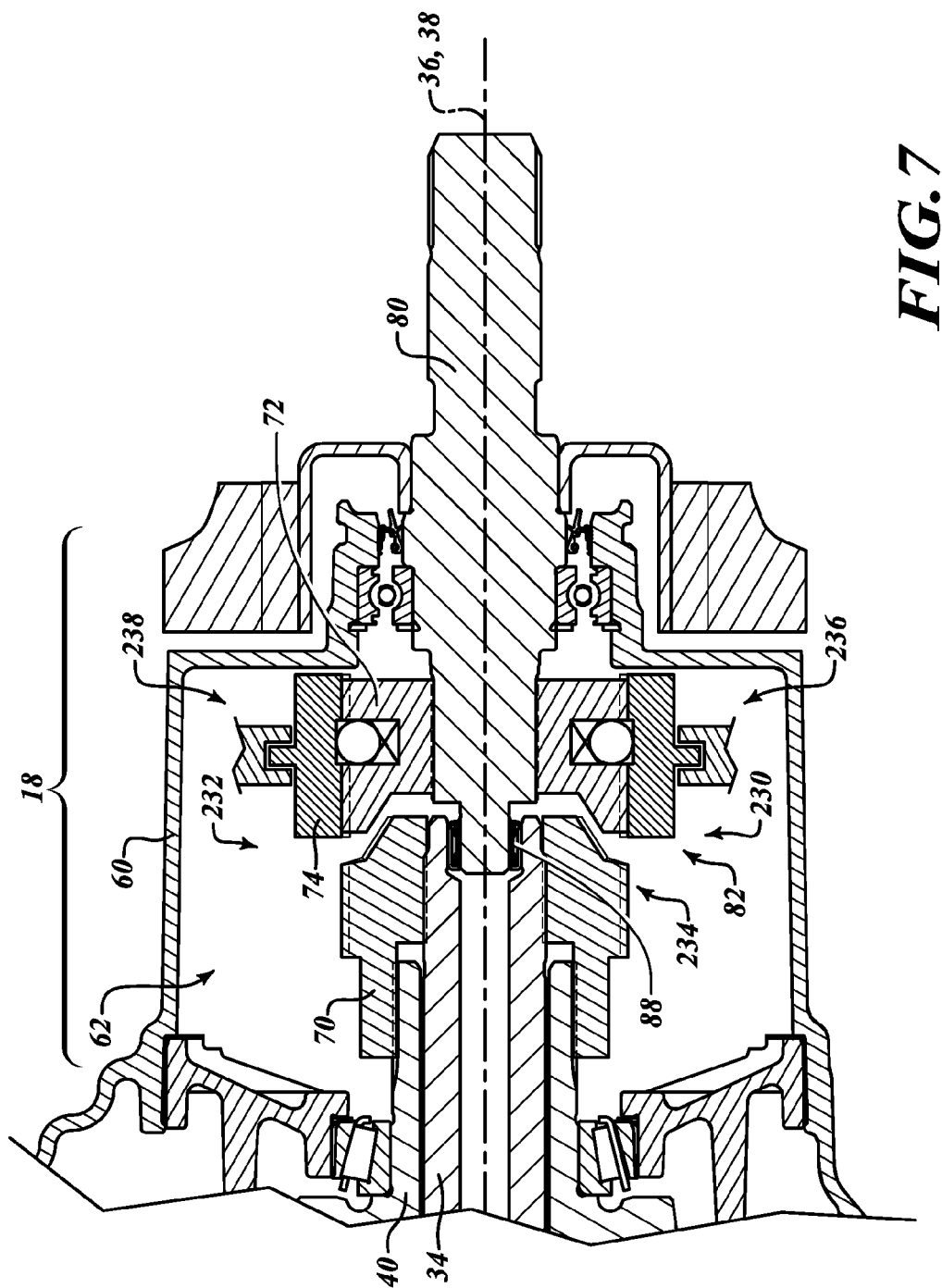
FIG. 7 is a longitudinal cross-sectional view similar to that of FIGS. 3 and 4 and illustrates a disconnect assembly that employs a synchronizer constructed in accordance with another example of the present teachings.

With reference to FIG. 7, one example of the synchronizer indicated by reference number 230 can employ a cone clutch 232, which can have mating frusto-conical clutch elements 234, 236, and a detent mechanism 238. The mating frusto-conical clutch elements 234, 236 can be disposed on rotatable components of the disconnect assembly, such as the output member 34 and the disconnect output member 72. One of the frusto-conical elements can be axially movable to frictionally engage the other one of the frusto-conical elements to permit the rotational speeds of the rotatable components to be matched. The detent mechanism 238 can be employed to resist movement of the coupling member relative to the disconnect output member to cause movement of the disconnect output member (and thereby the movable frusto-conical element) when the coupling member is moved to engage the output member.

It will be appreciated that either of the above-described drivetrain examples could be switched between the first mode (i.e., the mode in which rotary power is transmitted to the first vehicle wheels 54 of the primary driveline 16, as well as to the second vehicle wheels 190 of the secondary driveline 20) and the second mode (i.e., the mode in which rotary power is transmitted only to the first vehicle wheels 54 of the primary driveline 16) when rotary power is not transmitted through the drivetrain 14 and the vehicle 10 is in a stationary condition. It will also be appreciated in light of the disclosure that switching between the first and second modes may be performed during operation of the vehicle 10 when the vehicle 10 is moving.

In examples where torque-vectoring is implemented between the front driveline and the rear driveline, the synchronizer can be implemented to accommodate a rotation speed mismatch between the front and rear drivelines. To facilitate the torque-vectoring, the reduction ratios of the front and rear drivelines can be different. When the torque transfer device engages the rear driveline, the synchronizer can accommodate the speed mismatch to engage the propeller shaft to the front driveline.

Figure 8:
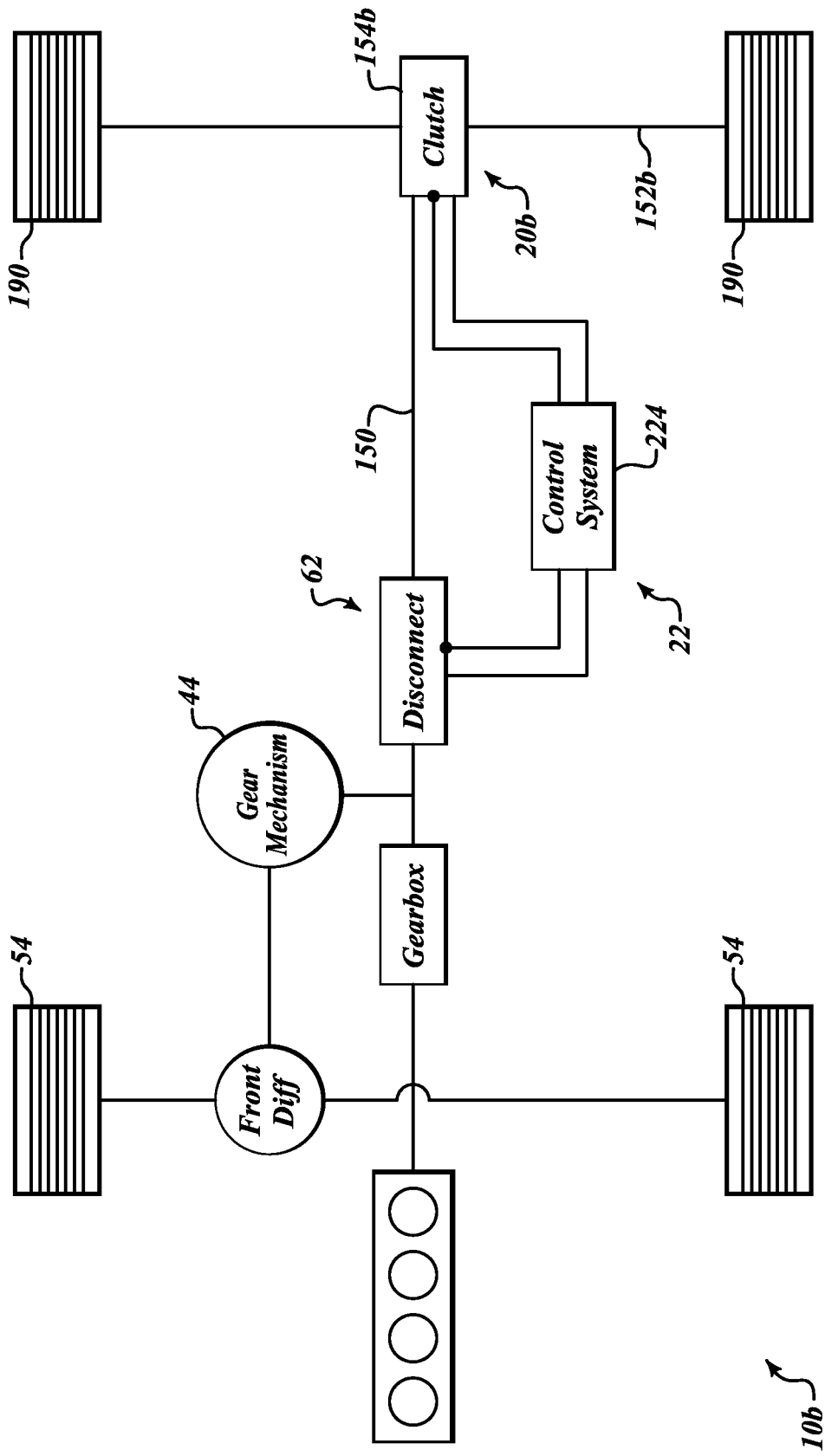
FIGS. 8 and 9 are schematic illustrations of vehicles having further exemplary drivetrains constructed in accordance with the present teachings.
Figure 9:
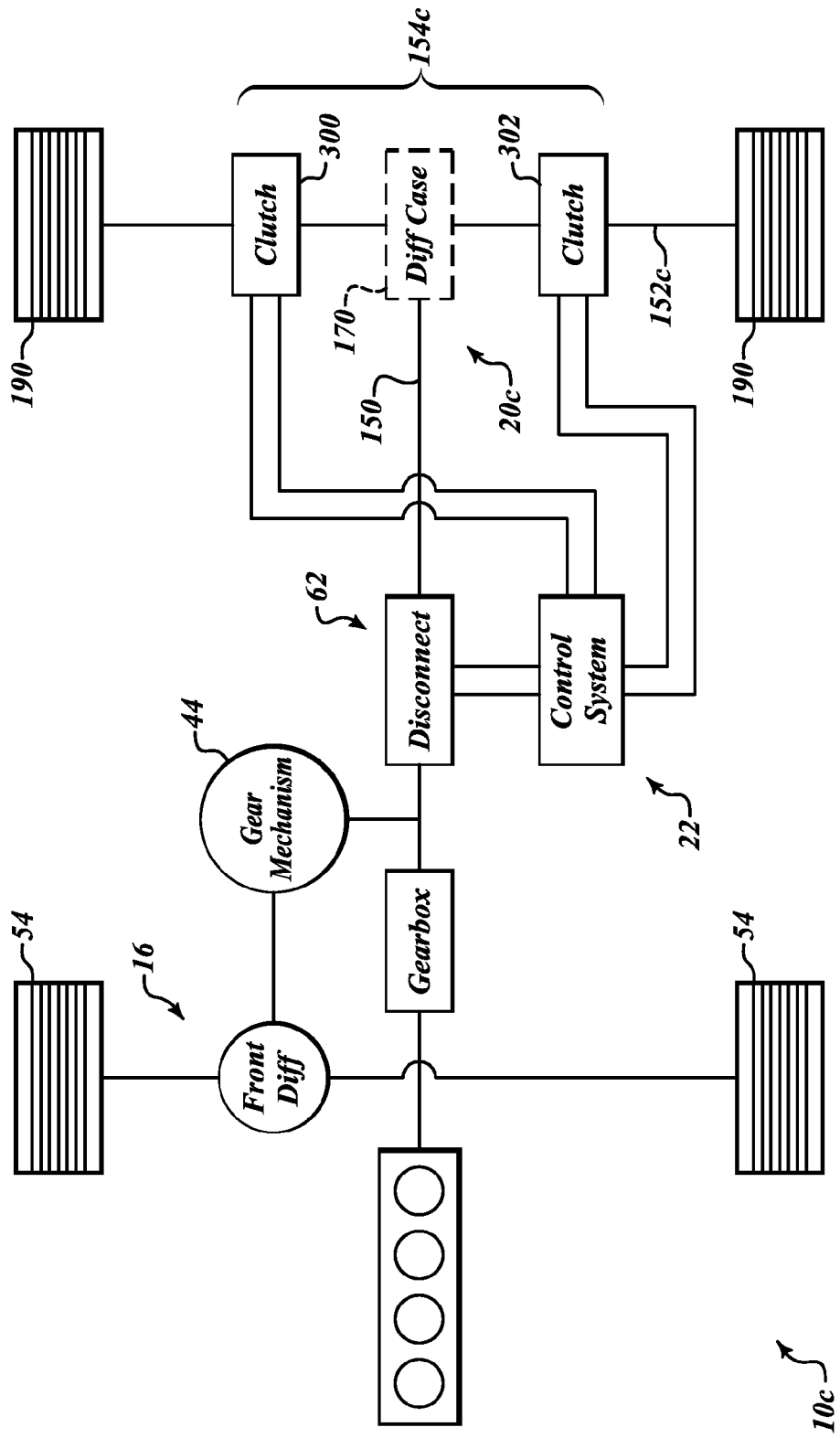

In the examples of FIGS. 8 and 9, the vehicles 10b and 10c are generally similar to the vehicle 10 of FIG. 2, except that some of all of the second differential assembly 164 (FIG. 5) can be omitted. In this regard, secondary axle assemblies 152b, 152c do not include the gearset 176 (FIG. 5). In the one implementation depicted in FIGS. 8 and 10, a second ring gear 172b can be employed to transmit rotary power directly to a torque transfer device 154b. The torque transfer device 154b can be operated in a disengaged state, which decouples the second vehicle wheels 190 from the second ring gear 172b, the propeller shaft 150 and the disconnect assembly 62, and an engaged state that can drivingly couple the second vehicle wheels 190 to the disconnect assembly 62. In some situations, it can be desirable to effectively lock the torque transfer device 154b to inhibit the differentiation of drive torque between the two second vehicle wheels 190.

Additionally or alternatively, it can be desirable to configure or control the torque transfer device 154b such that the transmission of drive torque to any one of the second vehicle wheels 190 can be limited. For example, it can be desirable to limit the maximum magnitude of the drive torque transmitted to any one of the second vehicle wheels 190 or to limit a maximum differential in the drive torque transmitted to the second vehicle wheels 190 or both. It will be appreciated in light of the disclosure that any limiting parameters (e.g., the magnitude of the maximum difference in the rotational speed of the second vehicle wheels 190, and/or the magnitude of the maximum difference in torque distributed to the second vehicle wheels 190, the magnitude to the maximum torque distributed to the second vehicle wheels 190) can be established as an absolute basis or can be varied based on vehicle specific data or both. The vehicle specific data can include, for example, the magnitude of the speed of the vehicle, the magnitude of a steering angle, and an identified loss of traction at one or more of the first and second vehicle wheels 54, 190.

In the one implementation illustrated in FIG. 9, a torque transfer device 154c can comprise a first clutch 300 and a second clutch 302 that can be employed to couple respective ones of the second vehicle wheels 190 to the differential case 170 for rotation therewith. The torque transfer device 154c (i.e., the first and second clutches 300 and 302) can be operated in a disengaged state, which decouples the second vehicle wheels 190 from the second ring gear (not specifically shown), the propeller shaft 150 and the disconnect assembly 62. The torque transfer device 154c can also be operated in an engaged state that can drivingly couple the second vehicle wheels 190 to the disconnect assembly 62. The first clutch 300 and the second clutch 302 can be separately actuated. In FIG. 8, the torque transfer device 154b, in contrast, can include single actuation of the clutches that connect to the ring gear.

In FIG. 9, it may be desirable in some situations to effectively lock the torque transfer device 154c that can inhibit the differentiation of drive torque between the two of the second vehicle wheels 190. Additionally or alternatively, it may be desirable to configure or control the torque transfer device 154c such that the transmission of drive torque to any one of the second vehicle wheels 190 can be limited. For example, it may be desirable to limit the maximum magnitude of the drive torque transmitted to any one of the second vehicle wheels 190 or to limit a maximum differential in the drive torque transmitted to the second vehicle wheels 190 or both.

It will be appreciated in light of the disclosure that any limiting parameters (e.g., the magnitude of the maximum difference in the rotational speed of the second vehicle wheels 190, the magnitude of the maximum difference in torque distributed to the second vehicle wheels 190, the magnitude to the maximum torque distributed to the second vehicle wheels 190) can be established as an absolute basis and/or can be varied based on vehicle specific data (e.g., the magnitude of the speed of the vehicle, the magnitude of a steering angle, an identified loss of traction at one or more of the first and second vehicle wheels 54, 190). It will be appreciated that the torque transfer device 154c (i.e., the first and second clutches 300 and 302) can permit torque vectoring between the primary and secondary drivelines 16 and 20c, as well as torque vectoring between the second vehicle wheels 190 driven by the secondary driveline 20c.

Figure 10:
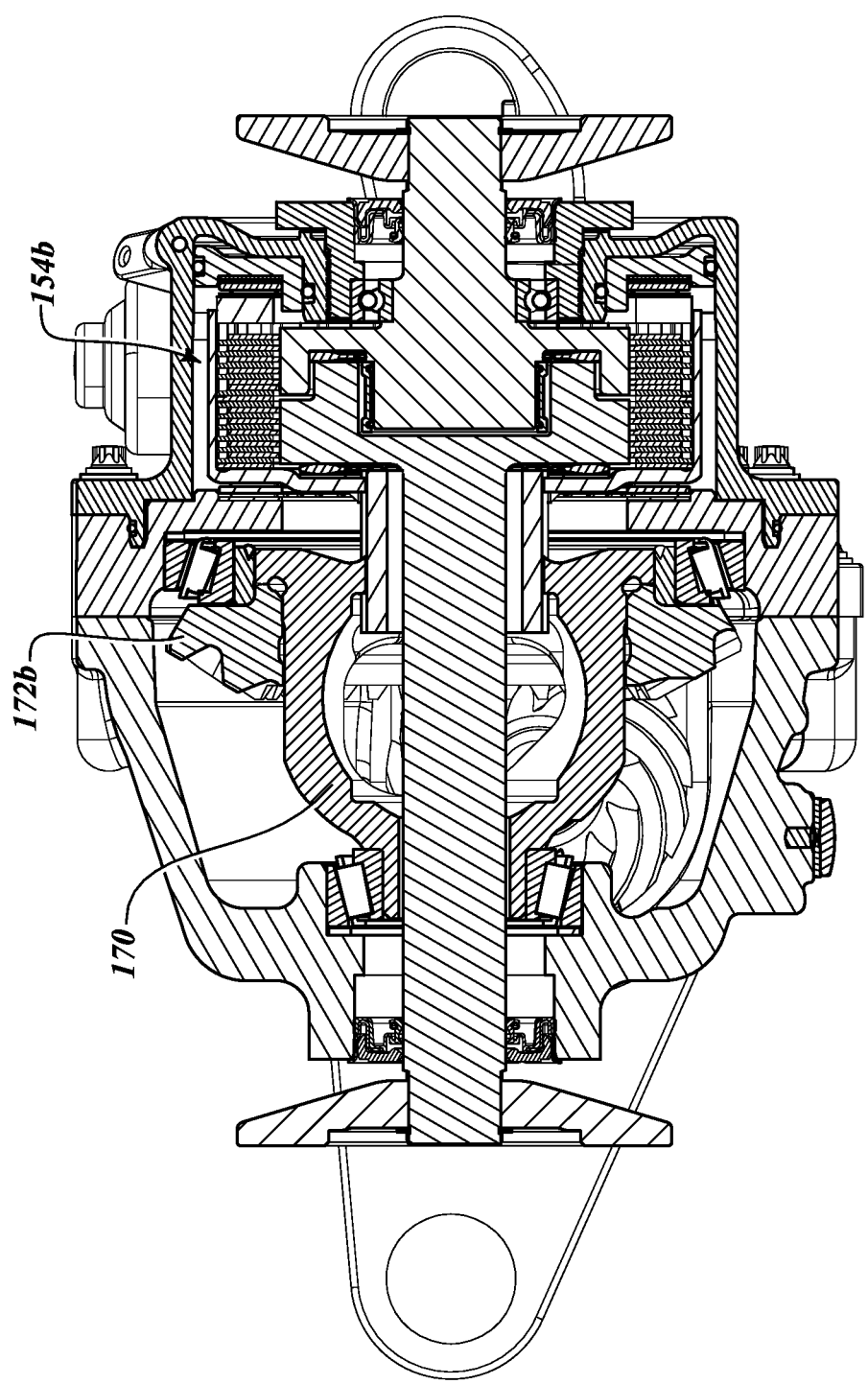
FIG. 10 is a transverse cross-sectional view of a portion of the drivetrain of FIG. 8 illustrating a rear axle assembly constructed in accordance with the present teachings.

The examples of FIGS. 8 through 10 may also employ a secondary driveline 20b, 20c with a reduction ratio that is different from the reduction ratio of the primary driveline 16 and in such cases, the torque transfer devices 154b, 154c can be configured or controlled to slip or cyclically disengage and re-engage as appropriate. It will be appreciated in light of the disclosure that the use reduction ratio that permits over-speeding of the secondary driveline 20b, 20c relative to the primary driveline 16 can aid in torque vectoring.

Figure 11:
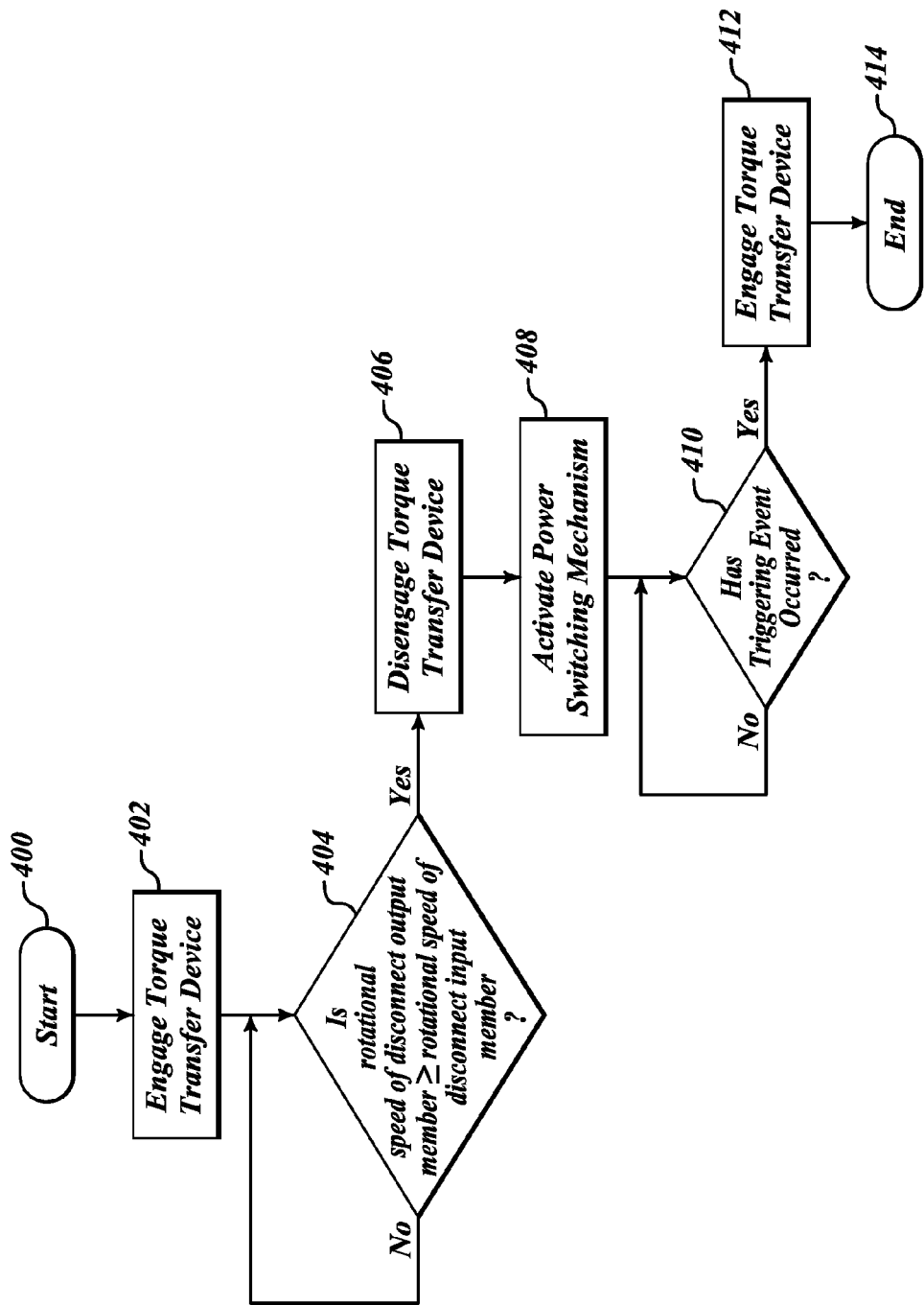
FIG. 11 is a flow diagram of a control algorithm that employs a methodology for controlling a drivetrain in accordance with the teachings of the present disclosure.

One exemplary control algorithm for controlling the operation of the above-described drivetrains in accordance with a methodology of the present disclosure is schematically illustrated in FIG. 11. Control begins at bubble 400 and progresses to block 402 where the torque transfer device 154, 154b, 154c is engaged to cause the set of second vehicle wheels 190 associated with the secondary driveline 20, 20b, 20c to be drivingly coupled to the propeller shaft 150. When the set of second vehicle wheels 190 associated with the secondary driveline 20 are rotating, it will be appreciated in light of the disclosure that rotation of the second vehicle wheels 190 can back-drive the differential case 170 and can cause the propeller shaft 150 to rotate. Control can proceed to decision block 404.

In decision block 404, when the rotational speed of the disconnect output member 72 is greater than or equal to the rotational speed of the disconnect input member 70, control can proceed to block 406. Otherwise, control can return to decision block 404.

In block 406, control can initiate disengagement of the torque transfer device 154, 154b, 154c. When the set of second vehicle wheels 190 associated with the secondary driveline 20, 20b, 20c are rotating, it will be appreciated in light of the disclosure that disengagement of the torque transfer device 154, 154b, 154c can prevent the back-driving of the differential case 170 and the corresponding rotation of the propeller shaft 150 and the disconnect output member 72. This, in turn, can permit the disconnect output member 72 to slow if necessary. Control can proceed to block 408.

In block 408, control can initiate activation of the power switching mechanism 18, 18a to in turn cause the coupling member 74 to drivingly engage the disconnect input member 70 and the disconnect output member 72. In this regard, rotary power can be transmitted through the power switching mechanism 18, 18a to the propeller shaft 150. Control can proceed to decision block 410.

When a triggering event has occurred in decision block 410, control can proceed to block 412. Otherwise, control can return to decision block 410. The triggering event can be the occurrence of a condition in which it is desirable to direct rotary power to one or more of the second vehicle wheels 190 associated with the secondary driveline 20, 20b, 20c. Such triggering events can include one or more of: a) slippage of one or both of the first vehicle wheels 54 of the primary driveline 16 in excess of a predetermined amount; b) a request for rapid acceleration; c) a request initiated by an operator of the vehicle; and d) combinations thereof.

In block 412, control can initiate engagement of the torque transfer device 154, 154b, 154c to permit rotary power to be transmitted through the secondary driveline 20, 20b, 20c to the second vehicle wheels 190. In instances where slippage of the torque transfer device 154, 154b, 154c is employed to control the differentiation of speed and torque between the primary and secondary drivelines 16 and 20, 20b, 20c, it will be appreciated in light of the disclosure that control can cause the torque transfer device 154, 154b, 154c to be maintained in an engaged condition until the control is terminated. In instances where cyclic disengagement and re-engagement is desired to control the differentiation of speed and torque between the primary and secondary drivelines 16 and 20, 20b, 20c, it will be appreciated in light of the disclosure that control can employ a routine to initiate the disengagement and re-engagement of the torque transfer device 154, 154b, 154c upon the occurrence of predetermined events. From block 412, control ends in bubble 414.

Figure 12:
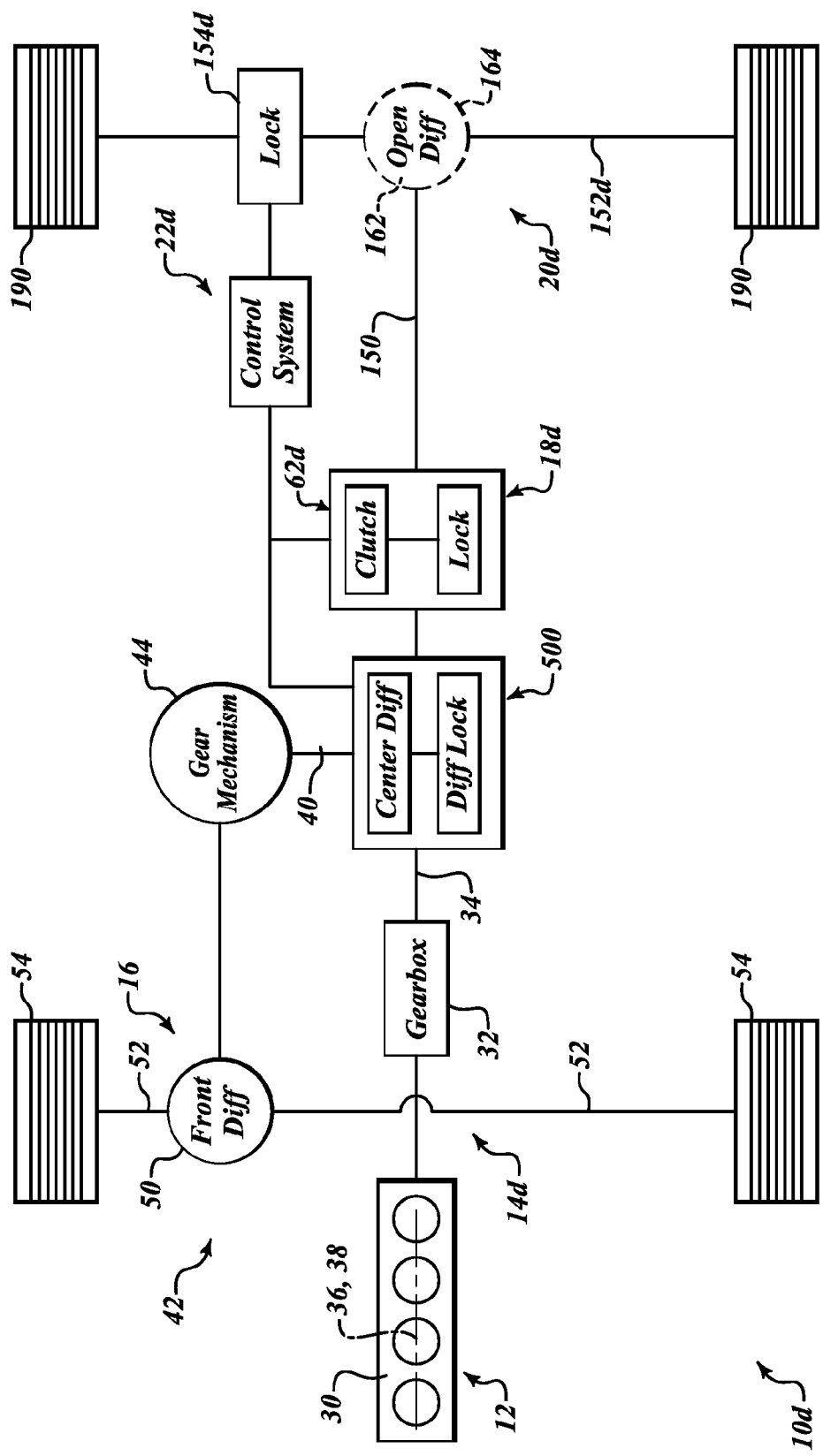
FIG. 12 is a schematic illustration of a vehicle having yet another exemplary drivetrain constructed in accordance with the present teachings.
Figure 13:
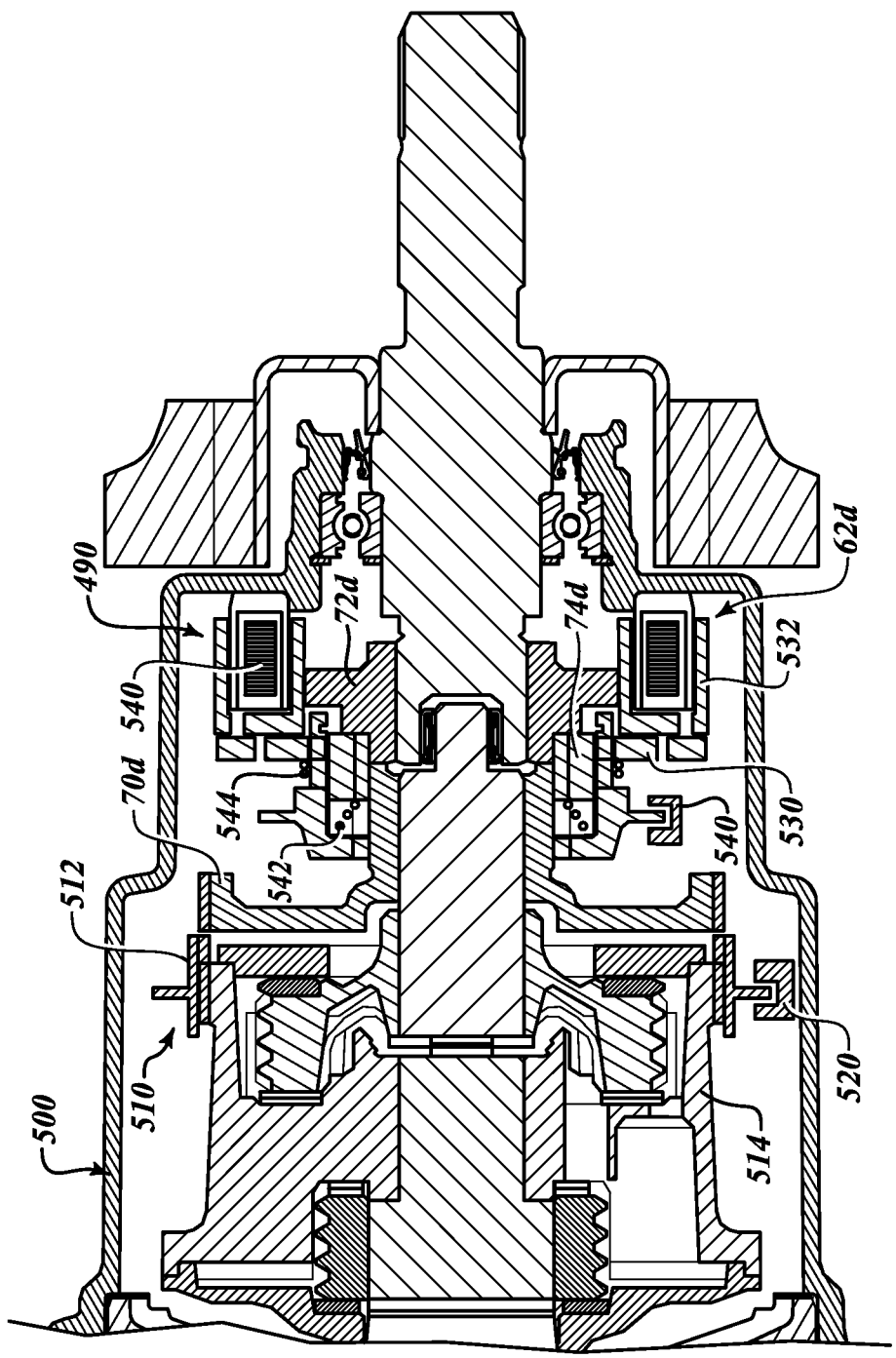
FIG. 13 is a longitudinal cross-sectional view of a portion of the drivetrain of FIG. 12 illustrating a portion of a center differential and a power switching mechanism constructed in accordance with the present teachings.

With reference to FIGS. 12 and 13, another vehicle constructed in accordance with the teachings of the present invention is generally indicated by reference numeral 10d. The vehicle 10d is generally similar to the vehicle 10 of FIG. 2, except that a center differential 500 can be coupled to the output member 34 of the transmission 32, a disconnect assembly 62d can include a clutch synchronizer 490 and a torque transfer device 154d of the secondary driveline 20d can comprise a dog clutch.

The center differential 500 can be configured to receive rotary power from the output member 34 of the transmission 32 and to input rotary power to the gear system 44 and to the disconnect input member 70. The center differential 500 can be selectively employed in a first mode to permit differentiation in the speed and torque of the rotary power that is transmitted between the primary driveline 16 and the secondary driveline 20 and a second mode in which the center differential 500 is locked.

The center differential 500 can be any type of locking differential that can be operated in an open manner but can be selectively locked to prevent differentiation. In the particular example provided, the center differential 500 can include a locking mechanism 510 having an internally splined ring 512 that can be slidingly disposed on a plurality of external splines formed on a differential case 514 of the center differential 500. The ring 512 can be moved axially from the position shown to a position where it is also engaged to external splines formed on a disconnect input member 70d. Any desired mechanisms can be employed to axially translate the ring 512, but in the particular example provided, a shift fork 520 can be employed.

The clutch synchronizer 490 can include an axially movable member 530, a friction member 532, and a means for moving the axially movable member 530. The axially movable member 530 can be a draw plate that can be axially movable but can be non-rotatably coupled to a coupling member 74d. The friction member 532 can be coupled to a disconnect output member 72d. The mechanisms for moving the axially movable member 530 can comprise any device for causing movement of the axially movable member 530. In the particular example provided, the mechanism can include an electromagnetic coil 540 that can be mounted to the housing of the disconnect assembly 62d and can be configured to produce a magnetic field that can draw the axially movable member 530 into frictional engagement with the friction member 532.

It will be appreciated in light of the disclosure that frictional engagement of the axially movable member 530 with the friction member 532 can tend to cause the coupling member 74d and the disconnect output member 72d to rotate at the same rotational speed. Any desired mechanisms can be employed to axially translate the coupling member 74d. In the particular example provided, the mechanism can be a shift fork 540. Biasing springs 542 and 544 can be employed to resiliently couple the axially movable member 530 and the coupling member 74d to the shift fork 540.

With reference to FIG. 12, a drivetrain 14d can be operated in a first mode in which rotary power is transmitted to the first vehicle wheels 54 mounted to the primary driveline 16, as well as to the second vehicle wheels 190 mounted to the secondary driveline 20d. To effect operation in the first mode, the center differential 500 can be operated in an unlocked condition, while the disconnect assembly 62d of the power switching mechanism 18d can be operated in an engaged condition and the torque transfer device 154d is operated in an engaged condition. The drivetrain 14d can include a center differential that can permit speed differentiation between the first driveline input member 40 and the input pinion 162. The torque transfer device 154d therefore need not be configured or controlled to slip or cyclically disengage and re-engage, even when the reduction ratio of the secondary driveline 20d is different from the reduction ratio of the primary driveline 16. As such, it will be appreciated in light of the disclosure that the torque transfer device 154d can be a friction clutch and can also be a clutch of the type having engaging teeth.

The drivetrain 14d can be also operated in a second mode in which rotary power can be transmitted exclusively to the first vehicle wheels 54 mounted to the primary driveline 16. To effect operation in the second mode, the center differential 500 can be operated in a locked condition, while the disconnect assembly 62d of the power switching mechanism 18d can be operated in a disengaged condition, and the torque transfer device 154d can be operated in a disengaged condition. Operation of the drivetrain 14d in this manner can disconnect the second vehicle wheels 190 of the secondary driveline 20d from the center differential 500 and the second differential assembly 164 so that the vehicle 10d can be operated with improved fuel economy relative to operation of the drivetrain 14d in the first mode.

It will be appreciated in light of the disclosure that the operational mode of the drivetrain 14d can be switched between the first and second modes when the vehicle 10d is not moving and in such situations an advanced control algorithm may not be needed to control the operation of the several components of the drivetrain 14d (i.e., the several components may simply be toggled into one state or another). It will also be appreciated in light of the disclosure that the operational mode of the drivetrain 14d may be switched between the first and second modes when the vehicle 10d is moving and that in such situations, it can be shown that coordination of the operation of the several components of the drivetrain 14d can be desirable.

In one example, a control system 22d can perform a control algorithm to change the operational mode of the drivetrain 14d from the second mode to the first mode. The control algorithm can comprise the following: activating the clutch synchronizer 490 to couple the disconnect output member 72d with the disconnect input member 70d such that the disconnect output member 72d and the disconnect input member 70d can be rotatably coupled to one another and can be brought into co-rotation (i.e., rotation at the same rotational speed). The control algorithm can also comprise operating the torque transfer device 154d in a locked state, which can permit the second vehicle wheels 190 to input rotary power to the secondary driveline 20d to back-drive the disconnect input member 70d such that the disconnect input member 70d rotates at a speed that is equal to a rotational speed of the output of the center differential 500. The control algorithm can further comprise unlocking the center differential 500 to permit differentiation in the speed and torque of the rotary power transmitted to the primary and secondary drivelines 16 and 20d, and locking the disconnect assembly 62d in a state in which transmission of rotary power between the center differential 500 and a secondary axle assembly 152d can be permitted. The control algorithm can then de-energize the clutch synchronizer 490.

Figure 14:
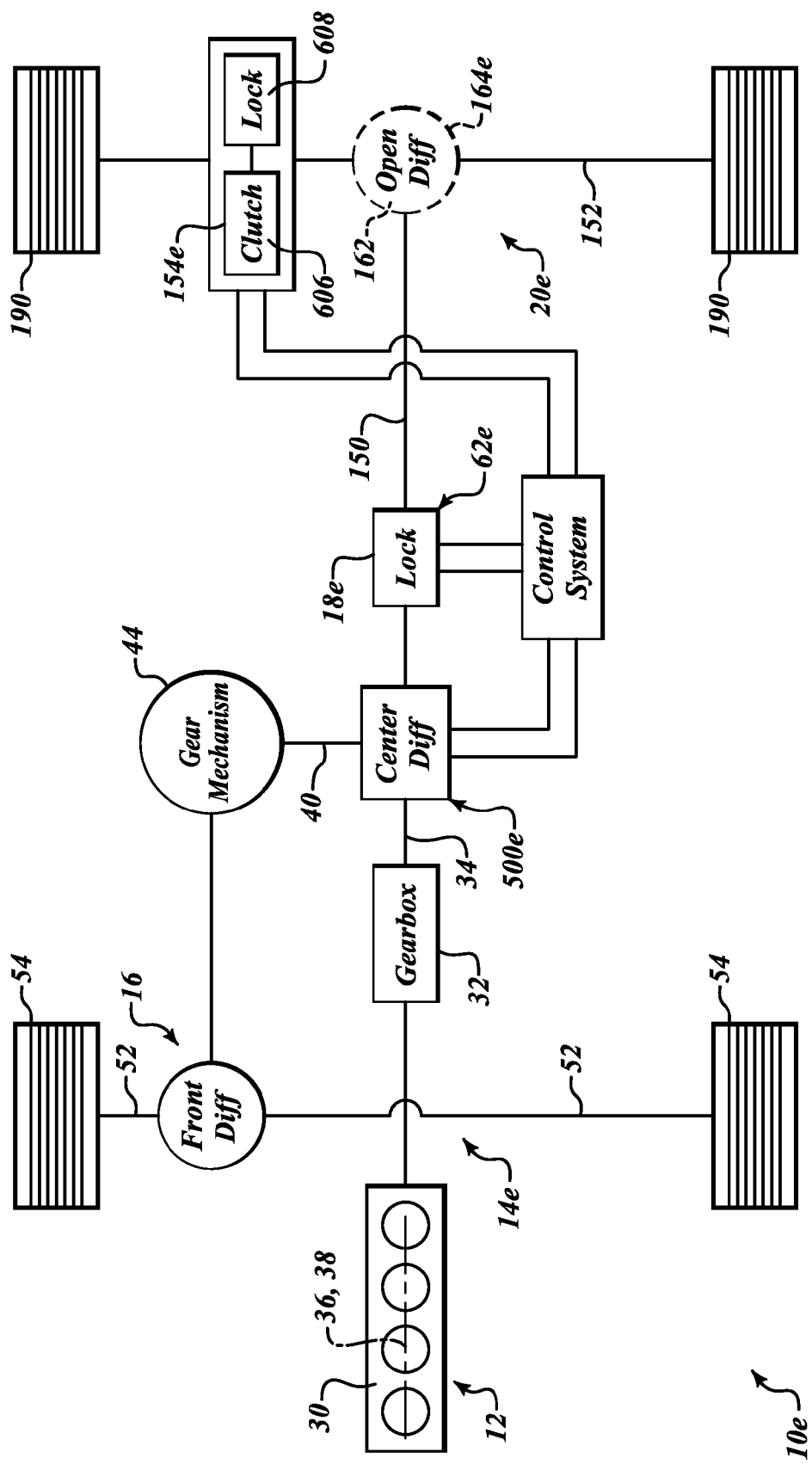
FIG. 14 is a schematic illustration of a vehicle having still another exemplary drivetrain constructed in accordance with the present teachings.
Figure 15:
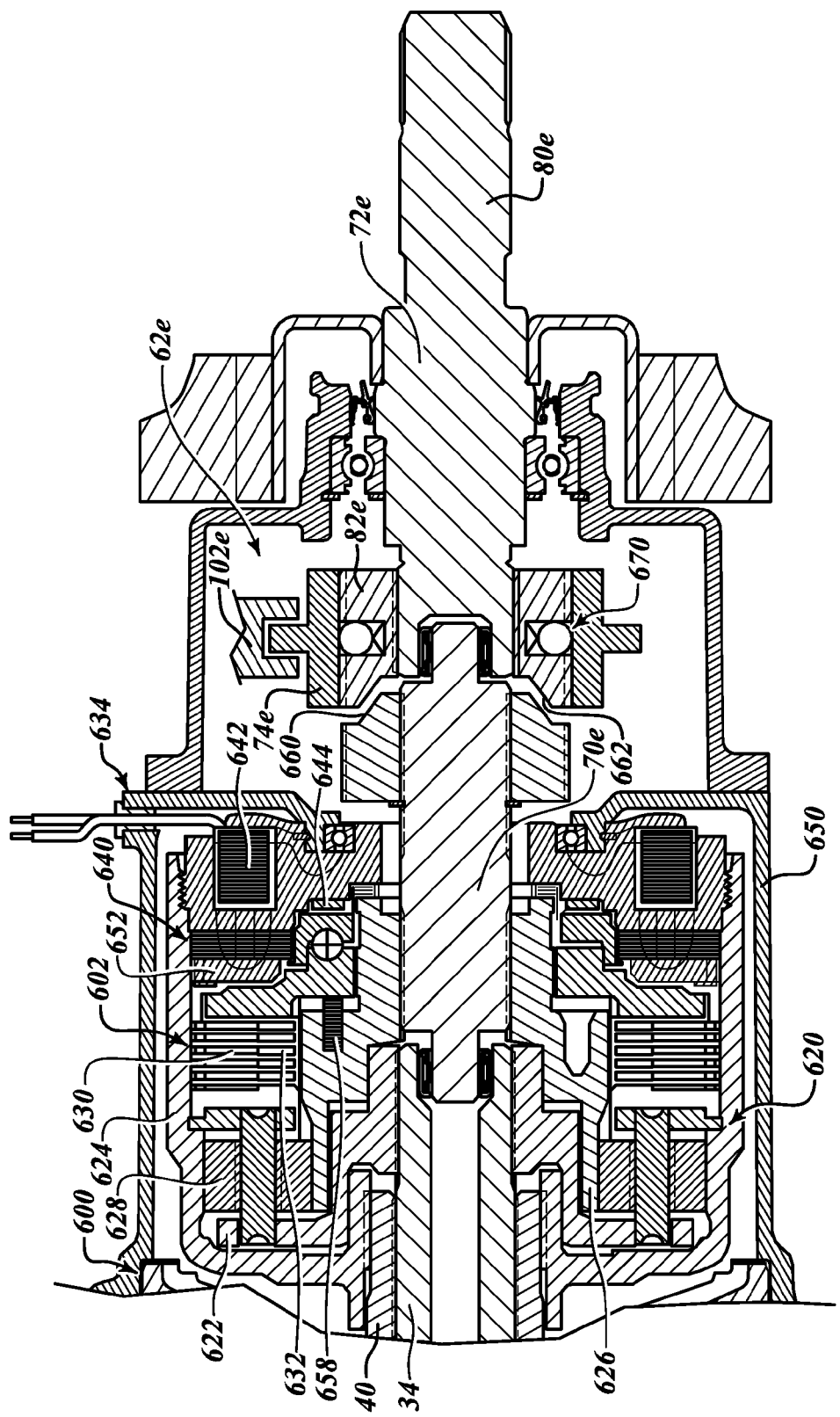
FIG. 15 is a longitudinal cross-sectional view of a portion of the drivetrain of FIG. 14 illustrating a portion of a center differential and a power switching mechanism constructed in accordance with the present teachings.
Figure 16:
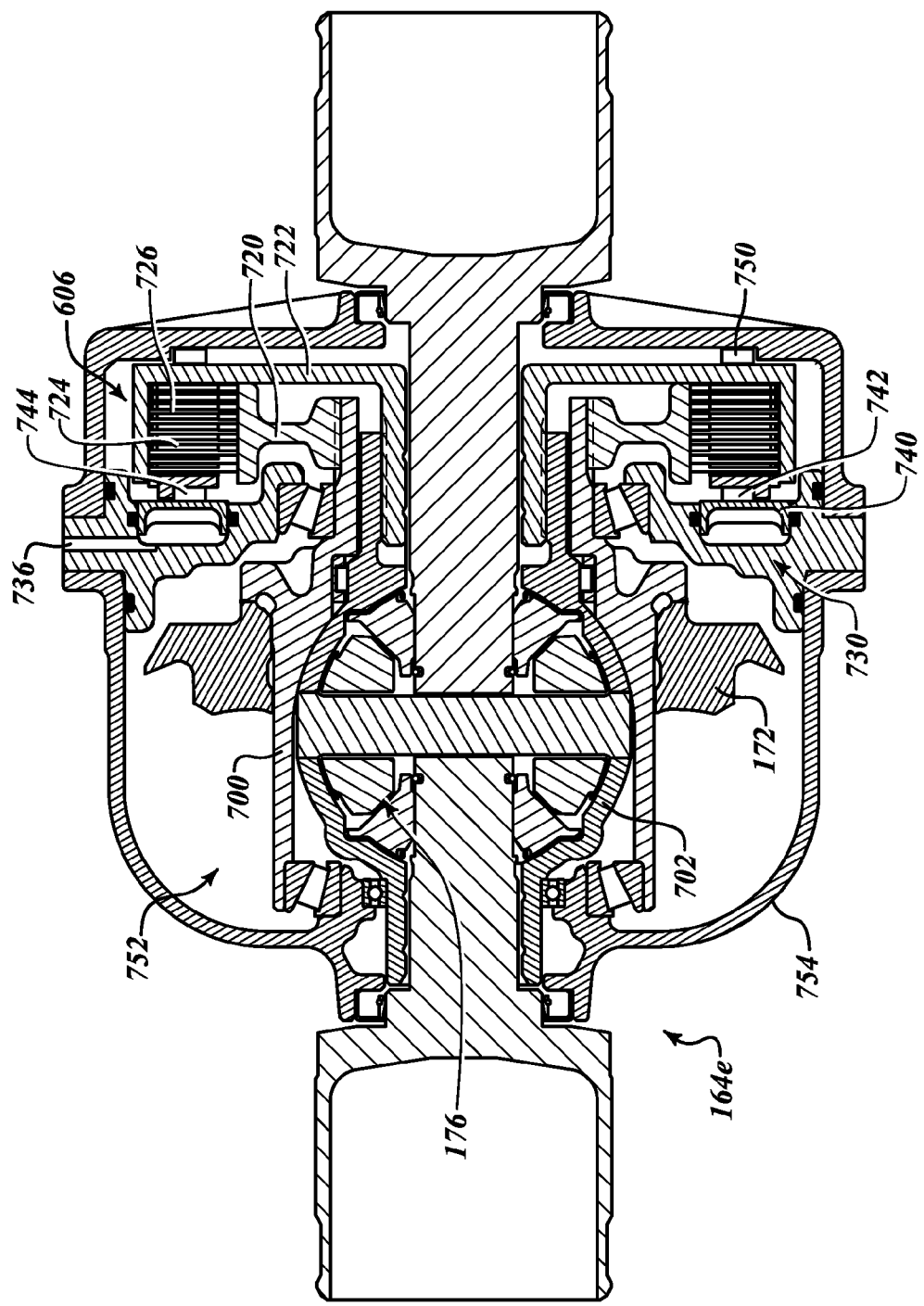
FIG. 16 is a longitudinal cross-sectional view of a portion of the drivetrain of FIG. 14 illustrating a portion of the secondary axle assembly constructed in accordance with the present teachings.

With reference to FIGS. 14 through 16, another vehicle constructed in accordance with the teachings of the present invention is generally indicated by reference numeral 10e. The vehicle 10e is generally similar to the vehicle 10d of FIG. 12, except that a center differential 500e can comprise a planetary differential 600 and a clutch 602, and a torque transfer device 154e can comprise a clutch 606, which has elements that can be operationally coupled to elements of the second differential assembly 164e of the secondary axle assembly 152e. A lock 608 can operationally couple elements of a second differential assembly 164e such that the clutch 606 need not be energized to transmit rotary power through the second differential assembly 164e. The lock 608 is not shown in detail, but can comprise any type of lock or disconnect, such as a dog clutch. It will be appreciated in light of the disclosure that the secondary axle assembly 152e can be employed in any of the drivetrains depicted in FIGS. 2, 6 and 8.

The planetary differential 600 can include a planetary gearset 620 that can comprise a planet carrier 622, which can be coupled for rotation with the output member 34 of the transmission 32, and a ring gear 624, which can be coupled to the first driveline input member 40 for rotation therewith. The planetary gearset 620 can also comprise a sun gear 626, which can be coupled for rotation with a disconnect input member 70e, and a plurality of planet gears 628 that can be journally supported by the planet carrier 622 and meshingly engaged with the ring gear 624 and the sun gear 626. The clutch 602 can be any type of clutch that can be employed to selectively lock the planetary gearset 620, and in the particular example provided, can comprise a friction clutch with a plurality of first friction plates 630, which are coupled to the ring gear 624 for rotation therewith, a plurality of second friction plates 632, which are coupled to the sun gear 626 for rotation therewith, and an actuator 634, that is configured to control actuation of the friction clutch (i.e., the clamping of the first and second friction plates 630 and 632 into frictional engagement with one another).

The actuator 634 can be any type of actuator, but in the particular example provided, includes an actuating friction clutch 640, an electromagnet 642, and a ball ramp actuator 644. The actuating friction clutch 640 can include a first portion, which can be mounted to the ring gear 624 for rotation in a housing 650 of the center differential 500e, a second portion, which can be mounted to a first portion of the ball ramp actuator 644 for rotation therewith, a first set of friction plates, which can be mounted to the first portion, and a second set of friction plates that can be mounted to the second portion. The ball ramp actuator 644 can further comprise a second portion, which is axially slidably but rotatably coupled to the sun gear 626, and a plurality of balls that are disposed between the first and second portions. The actuating friction clutch 640 can be configured to selectively apply a rotary drag force to the ball ramp actuator 644 that can inhibit rotation of the first portion relative to the ring gear 624 so as to cause the ball ramp actuator 644 to axially expand in response to relative rotational movement between the ring gear 624 and the sun gear 626 (which thereby causes relative rotational movement between the first and second portions) such that a force is applied to the clutch 602 that clamps the first and second friction plates 630 and 632 to one another.

A biasing spring 658 can bias the second portion of the ball ramp actuator 644 into an axially retracted condition (i.e., in a position closest to the first portion) so that the first friction plates 630 are not frictionally engaged to the second friction plates 632 to an extent where the planetary gearset 620 is not locked. The electromagnet 642 can be fixedly mounted to the housing 650 of the center differential 500e and can be received in a cavity formed in the first portion. The electromagnet 642 can be engaged to create a magnetic field that urges a draw plate 652 toward the first portion to thereby apply a force to the first and second sets of friction plates (of the actuating friction clutch 640) to thereby generate the rotary drag force.

It will be appreciated in light of the disclosure that the ring gear 624, which can be coupled for rotation with the first driveline input member 40 for rotation therewith, and the sun gear 626, which can be coupled for rotation with the disconnect input member 70e, can rotate relative to one another to permit differentiation in the speed and torque of the rotary power transmitted through the center differential 500e when the clutch 602 is disengaged. In this regard, relative rotation between the ring gear 624 and the sun gear 626 can be inhibited (i.e., the center differential 500e can be locked) when the clutch 602 is engaged.

With reference to FIG. 14, a disconnect assembly 62e can be configured such that a clutch portion 82e of a disconnect output member 72e can be non-rotatably but axially movably disposed on a shaft portion 80e and mating frusto-conical clutch faces 660 and 662 can be formed on the disconnect input member 70e and the clutch portion 82e, respectively. A detent mechanism 670 can be employed to couple the clutch portion 82e with the coupling member 74e such that movement of a coupling member 74e (i.e., via the shift fork 102e in the example provided) can cause engagement of the frusto-conical clutch face 662 with the frusto-conical clutch face 660 to synchronize the rotational speeds of the disconnect input member 70e and the disconnect output member 72e with one another. The coupling member 74e can be employed to rotationally lock the disconnect input member 70e and the disconnect output member 72e.

With reference to FIG. 16, the second differential assembly 164e can include a differential case having an outer case member 700 and an inner case member 702. The outer case member 700 can be coupled for rotation with a second ring gear 172e and can be supported for rotation in a carrier housing 160e via a set of bearings. The inner case member 702 can be coupled to the gearset 176 and can be supported for rotation relative to the carrier housing 160e and the outer case member 700 via sets of bearings. The clutch 606 can be any type of clutch that can be employed to selectively non-rotatably couple the outer case member 700 and the inner case member 702.

In the example provided, the clutch 606 can be a friction clutch that includes a first clutch portion 720, which is non-rotatably coupled to the outer case member 700, and a second clutch portion 722, which is non-rotatably coupled to the inner case member 702. The clutch 606 also can include a plurality of first clutch plates 724, which can be non-rotatably coupled to the first clutch portion 720, and a plurality of second clutch plates 726, which can be interleaved with the first clutch plates 724 and non-rotatably coupled to the second clutch portion 722. An actuator 730 can be employed to generate a force to cause frictional engagement of the first and second clutch plates 724 and 726.

In the particular example provided, the actuator 730 can comprise an annular hydraulic cylinder that is hydraulically actuated via a hydraulic fluid communicated through a hydraulic line 736 that can extend through the carrier housing 160. The hydraulic cylinder can comprise an annular piston 740 that can be employed to exert a force on a thrust bearing 742 that is mounted on a pusher plate 744 that is abutted against a first one of the first clutch plates 724. A second thrust bearing 750 can be received between the carrier housing 160e and the second clutch portion 722 that can inhibit axial movement of the second clutch portion 722 away from the first clutch portion 720 when the actuator 730 is actuated. A locking mechanism can be employed to lock the ring gear 172e to the housing 754.

With reference to FIG. 14, a drivetrain 14e can be operated in a first mode in which rotary power is transmitted to the first vehicle wheels 54 mounted to the primary driveline 16, as well as to the second vehicle wheels 190 mounted to the secondary driveline 20e. To effect operation in the first mode, the center differential 500e can be operated in an unlocked condition, while the disconnect assembly 62e of the power switching mechanism 18e can be operated in an engaged condition and the torque transfer device 154e can be operated in an engaged condition. The drivetrain 14e can include a center differential 500e that can permit speed differentiation between the first driveline input member 40 and the input pinion 162. The torque transfer device 154e therefore need not be configured or controlled to slip or cyclically disengage and re-engage, even when the reduction ratio of the secondary driveline 20e is different from the primary driveline 16.

The drivetrain 14e can be also operated in a second mode in which rotary power can be transmitted exclusively to the first vehicle wheels 54 mounted to the primary driveline 16. To effect operation in the second mode, the center differential 500e can be operated in a locked condition, while the disconnect assembly 62e of the power switching mechanism 18e can be operated in a disengaged condition, and the torque transfer device 154e can be operated in a disengaged condition. Operation of the drivetrain 14e in this manner can disconnect the second vehicle wheels 190 of the secondary driveline 20e from the center differential 500e and the second differential assembly 164e so that the vehicle 10e can be operated with improved fuel economy relative to operation of the drivetrain 14e in the first mode.

It will be appreciated in light of the disclosure that the operational mode of the drivetrain 14e can be switched between the first and second modes when the vehicle 10e is not moving. In such situations, an advanced control algorithm may not be needed to control the operation of the several components of the drivetrain 14e (i.e., the several components may simply be toggled into one state or another). It will also be appreciated that the operational mode of the drivetrain 14e can be switched between the first and second modes when the vehicle 10e is moving and that in such situations, it is desirable that coordination of the operation of the several components of the drivetrain 14e can be desirable.

In one form, a control system 22e can perform a control algorithm to change the operational mode of the drivetrain 14e from the second mode to the first mode. The control algorithm can comprise the following: activating the torque transfer device 154e to couple the second vehicle wheels 190 to the second differential assembly 164e; and decoupling the torque transfer device 154e when a rotational speed of the propeller shaft 150 exceeds a rotational speed of the output member 34 of the transmission 32. The control algorithm can also comprise locking the disconnect assembly 62e of the power switching mechanism 18e; disengaging the clutch 602 of the center differential 500e; and engaging the torque transfer device 154e. It will be appreciated in light of the disclosure that the clutch 602 of the center differential 500e and the torque transfer device 154e can be disengaged and engaged, respectively, in a gradual and simultaneous manner if desired. It will also be appreciated in light of the disclosure that the torque transfer device 154e can include a disconnect assembly, such as a dog clutch (not shown), that can be engaged to thereby rotatably couple an inner differential case 752 to an outer differential case 754 so that the clutch 606 of the torque transfer device 154e can be disengaged.

While the several examples depicted in the drawings and described in detail above employ a gear system in the form of a bevel gear, it will be appreciated that the teachings of the present disclosure have application to various other types of powertrain/drivetrain combinations that employ other mechanisms for distributing rotary power to a primary driveline and/or a secondary driveline. Accordingly, it will be appreciated in light of the disclosure that other power transmitting systems can be employed, including without limitation gear trains (with spur gears, helical gears, face gears, bevel gears, planetary gears, and/or combinations thereof) and drives that can employ endless power transmitting elements such as belts and chains.

Figure 17A:
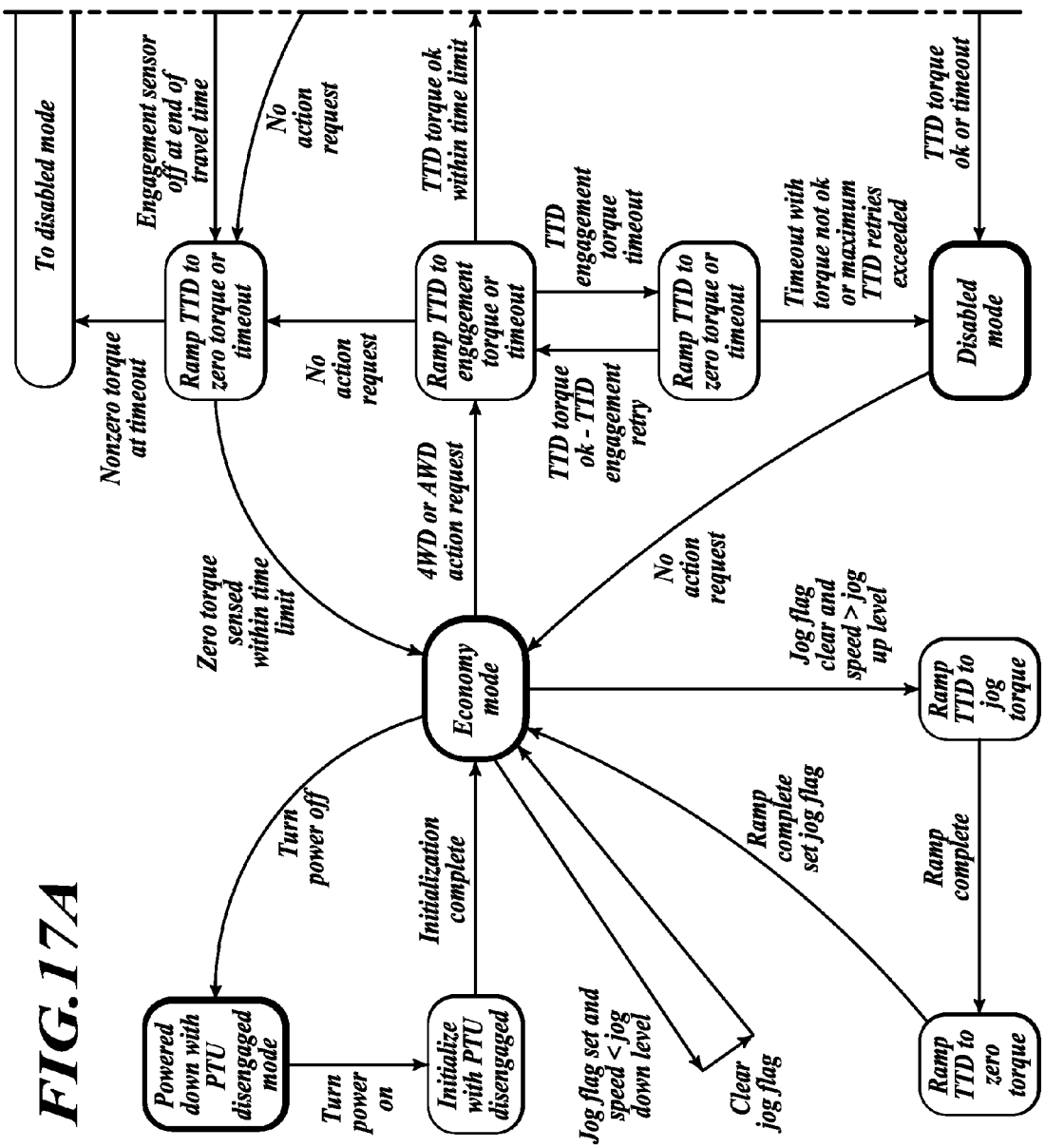
FIGS. 17A and 17B are flow diagrams of another control algorithm that employs a methodology for controlling a drivetrain in accordance with the present teachings.
Figure 17B:
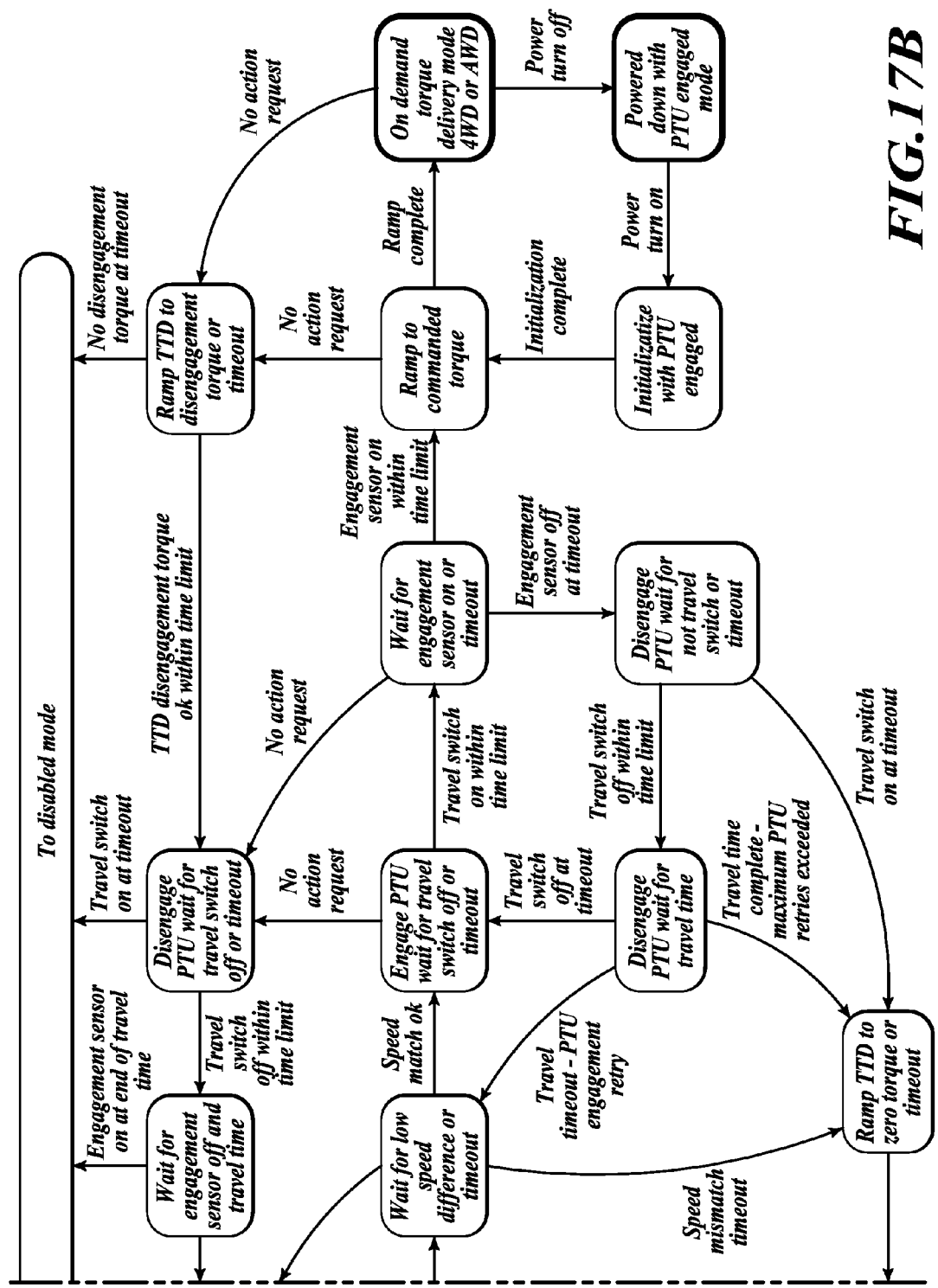

In FIGS. 17A and 17B, another control algorithm employing a methodology of the present disclosure is illustrated schematically in a flow-chart form. In the control algorithm the "economy mode" refers to operation of the drivetrain of a vehicle in the economy mode (i.e., with rotary power directed from the powertrain 12 to only to the first vehicle wheels 54 of the primary driveline 16). The "on demand torque delivery mode" refers to a mode in which rotary power is directed from the powertrain to the first and second vehicle wheels 54 and 190. The term "PTU" refers to the power switching mechanism. The term "TTD" refers to the torque transfer device.

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration, or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

The terminology used herein is for the purpose of describing particular example aspects only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A drivetrain comprising:
an input shaft that is rotatable about a first axis, the input shaft being adapted to be driven by a powertrain having a prime mover with an output member that is rotatable about the first axis;
a gear drive receiving rotary power from the input shaft, the gear drive having a gear drive output that is disposed about a second axis that is not coincident with the first axis;
a front axle assembly with a front input pinion, a front ring gear and a front differential, the front input pinion being driven by the gear drive output about the second axis, the front ring gear being a bevel ring gear and being meshed with the front input pinion, the front differential receiving rotary power from the front ring gear;
a propshaft assembly;
a power switching mechanism with a power switching input, which is coupled to the input shaft for rotation therewith, and a power switching output, which is coupled to the propshaft for common rotation, the power switching mechanism being operable in a first switching mode, which inhibits transmission of rotary power between the power switching input and the power switching output, and a second switching mode that permits transmission of rotary power between the power switching input and the power switching output;
a rear axle assembly having a rear axle input that is coupled to an end of the propshaft assembly opposite the power switching input;
first and second shafts; and
a torque transfer device (TTD) that is operable in a first TTD mode, in which transmission of rotary power between the rear axle input and at least one of the first and second shafts is inhibited, and a second TTD mode in which transmission of rotary power between the rear axle input and the at least one of the first and second shafts is permitted.

2. The drivetrain of claim 1, wherein the rear axle comprises a rear differential that is housed in a rear axle housing.

3. The drivetrain of claim 2, wherein the torque transfer device includes a friction clutch.

4. The drivetrain of claim 3, wherein the friction clutch is housed in the rear axle housing.

5. The drivetrain of claim 2, wherein the rear differential comprises a differential gearset and wherein the torque transfer device selectively couples one of the first and second shafts to the differential gearset.

6. The drivetrain of claim 1, wherein a front reduction ratio associated with rotary power transmitted between the input shaft and a set of front wheels that are adapted to be driven by the front axle assembly is different from a rear reduction ratio associated with rotary power transmitted between the input shaft and a set of rear wheels that are adapted to be driven by the rear axle assembly.

7. The drivetrain of claim 1, wherein the torque transfer device permits rotational speed differentiation between a pair of front wheels driven by the front axle assembly and a pair of rear wheels driven by the rear axle assembly.

8. The drivetrain of claim 1, further comprising a control module connected to the power switching mechanism and the torque transfer device, the control module being configured to switch the drivetrain between a first drivetrain mode, in which the power switching mechanism operates in the first switching mode and the torque transfer device operates in the first TTD mode, and a second drivetrain mode, in which the power switching mechanism operates in the second switching mode and the torque transfer device operates in the second TTD mode.

9. The drivetrain of claim 1, wherein the first and second rotational axes are parallel.

10. The drivetrain of claim 1, wherein the power switching mechanism includes a synchronizer and an electromagnetic that is selectively operable to move the synchronizer.

* * * * *